US012586449B2

(12) United States Patent　　　(10) Patent No.: US 12,586,449 B2

Voss　　　(45) Date of Patent: Mar. 24, 2026

(54) MOBILE DEVICE PLATFORM FOR AUTOMATED VISUAL RETAIL PRODUCT RECOGNITION

(71) Applicant: Mastercard Asia/Pacific Pte. Ltd., Singapore (SG)

(72) Inventor: Catalin Voss, San Francisco, CA (US)

(73) Assignee: Mastercard Asia/Pacific Pte. Ltd., Singapore (SG)

( * ) Notice: Subject to any disclaimer, the term of this patent is extended or adjusted under 35 U.S.C. 154(b) by 0 days.

(21) Appl. No.: 18/497,975

(22) Filed: Oct. 30, 2023

(65) Prior Publication Data

US 2024/0071185 A1　　Feb. 29, 2024

Related U.S. Application Data

(63) Continuation of application No. 16/630,785, filed as application No. PCT/SG2018/050347 on Jul. 12, 2018, now Pat. No. 11,804,112.

(60) Provisional application No. 62/531,843, filed on Jul. 12, 2017.

(51) Int. Cl.

| | |
|---|---|
| *G07G 1/00* | (2006.01) |
| *G06F 16/16* | (2019.01) |
| *G06F 18/21* | (2023.01) |
| *G06F 18/241* | (2023.01) |
| *G06F 18/40* | (2023.01) |
| *G06K 7/10* | (2006.01) |
| *G06K 7/14* | (2006.01) |
| *G06N 3/08* | (2023.01) |
| *G06Q 20/20* | (2012.01) |
| *G06Q 20/32* | (2012.01) |

(52) U.S. Cl.

CPC ......... *G07G 1/0054* (2013.01); *G06F 16/164* (2019.01); *G06F 18/217* (2023.01); *G06F 18/241* (2023.01); *G06F 18/40* (2023.01);

*G06K 7/1413* (2013.01); *G06N 3/08* (2013.01); *G06Q 20/208* (2013.01); *G06Q 20/322* (2013.01); *G06K 2007/10504* (2013.01)

(58) Field of Classification Search

CPC ... G06Q 20/208; G06Q 20/322; G06F 18/241

USPC ......................................................... 705/23

See application file for complete search history.

(56) References Cited

U.S. PATENT DOCUMENTS

2016/0328660 A1* 11/2016 Huang ................. G07G 1/0045

* cited by examiner

*Primary Examiner* — Ariel J Yu

*Assistant Examiner* — Denisse Y Ortiz Roman

(74) *Attorney, Agent, or Firm* — Hovey Williams LLP

(57) ABSTRACT

A computer-implemented method for configuring a mobile point-of-sale application to perform automated product-recognition checkout processes. The application includes a convolutional neural network including hidden layer n positioned downstream of remaining hidden layers and downstream of an input segment of the convolutional neural network. The method includes: appending a fine classification arm operating on output from hidden layer n and having a first loss function for generating output; appending a second classification arm operating on the output from one of the remaining n hidden layers upstream from hidden layer n and having a second loss function for generating output; providing a plurality of true labels for image subset(s) and applicable to at least one product class; and training the CNN by passing the image subsets therethrough, observing corresponding output of the first and second loss functions, and iteratively adjusting values of CNN model parameters based on the loss function outputs.

16 Claims, 8 Drawing Sheets

900

MOBILE DEVICE PLATFORM FOR AUTOMATED VISUAL RETAIL PRODUCT RECOGNITION

CROSS-REFERENCE TO RELATED APPLICATION

The present application is a continuation patent application of and claims priority benefit to identically-titled U.S. patent application Ser. No. 16/630,785, filed Jan. 13, 2020, which is a National Stage Entry of identically-titled PCT/SG2018/050347, filed Jul. 12, 2018, which, in turn, claims the benefit of and priority from U.S. Provisional Patent Application Ser. No. 62/531,843, filed Jul. 12, 2017, entitled SYSTEMS AND METHODS FOR PROVIDING A RETAIL PLATFORM, and the entirety of the disclosure of each of the foregoing applications is hereby incorporated by reference herein.

FIELD OF THE INVENTION

The present disclosure generally relates to computer-implemented methods, systems comprising computer-readable media, and electronic devices for conducting point-of-sale (POS) transactions in a network of low-power mobile devices utilizing automated visual retail product recognition.

BACKGROUND

Retailers in emerging markets often conduct business without the use of supporting technologies. More particularly, digital customer interfaces, barcode scanners, steady and fast data connections to backend server systems, UPC-tagged products, and other technology ubiquitous in the developed world are frequently absent at smaller retail storefronts in emerging markets. Moreover, many such establishments sell sub-units of barcoded products, which further complicates any attempt at adoption of more modern technology.

Consequently, whether to save on overhead or because modern technology is simply unavailable, many such retailers place a relatively low burden on surrounding infrastructure in terms of power and/or data transfer service consumption, and the like. In fact, such retailers' checkout procedures—and related inventory tracking functions—are often conducted by hand or with other media, eschewing digital technologies such as barcode scanning and digital tracking resources. Unfortunately, such systems are fragile, fail to provide market- or inventory-transparency to owners, and are prone to error. Nonetheless, existing technology does not offer a means for low-power, automated product-recognition checkout and inventory-tracking that might be offered to retailers in emerging markets.

This background discussion is intended to provide information related to the present invention which is not necessarily prior art.

BRIEF SUMMARY

Embodiments of the present technology relate to computer-implemented methods, systems comprising computer-readable media, and electronic devices for conducting point-of-sale transactions in a low-power mobile device network utilizing automated visual retail product recognition. The embodiments may provide a sustainable, low-power digital solution having improved accuracy, reliability and transparency for owners of retail establishments in emerging markets.

In a first aspect, a computer-implemented method for configuring a mobile point-of-sale application to perform automated product-recognition checkout processes may be provided. The method may include: (1) providing a convolutional neural network including n hidden layers and corresponding model parameters, the n hidden layers including hidden layer n positioned downstream of the remaining hidden layers and downstream of an input segment of the convolutional neural network; (2) appending a fine classification arm to the convolutional neural network, the fine classification arm operating on the output from hidden layer n; (3) appending a second classification arm to the convolutional neural network, the second classification arm operating on the output from one of the remaining n hidden layers upstream from hidden layer n; (4) providing a plurality of image subsets, each image subset relating to a product class; (5) providing a plurality of true labels, each true label being applicable to at least one of the product classes; (6) providing a first loss function configured to generate output of the fine classification arm; (7) providing a second loss function configured to generate output of the second classification arm; and (8) training the convolutional neural network at least in part by: (a) passing the image subsets through the convolutional neural network; (b) observing the output of the first and second loss functions in response to passing the image subsets through the convolutional neural network; (c) iteratively adjusting values of the model parameters based at least in part on the output of the first and second loss functions. The method may include additional, less, or alternate actions, including those discussed elsewhere herein.

In another aspect, a mobile electronic device comprising a processing element and computer-readable media for performing automated product-recognition processes based on input image frames received from a photographic element may be provided. The non-transitory computer-readable media may include computer-readable instructions stored thereon that instruct the processing element of the mobile electronic device to complete the following data processing steps without sending or receiving the processed data over an active data connection to any other computing device: (1) pass an input image frame of the input image frames depicting a product through a convolutional neural network stored on the computer-readable media; (2) generate a product classification for the product based at least in part on passage of the image frame through the convolutional neural network; and (3) record product metadata corresponding to the product to a record of the automated product-recognition process. The instructions stored on the computer-readable media may instruct the processing element to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
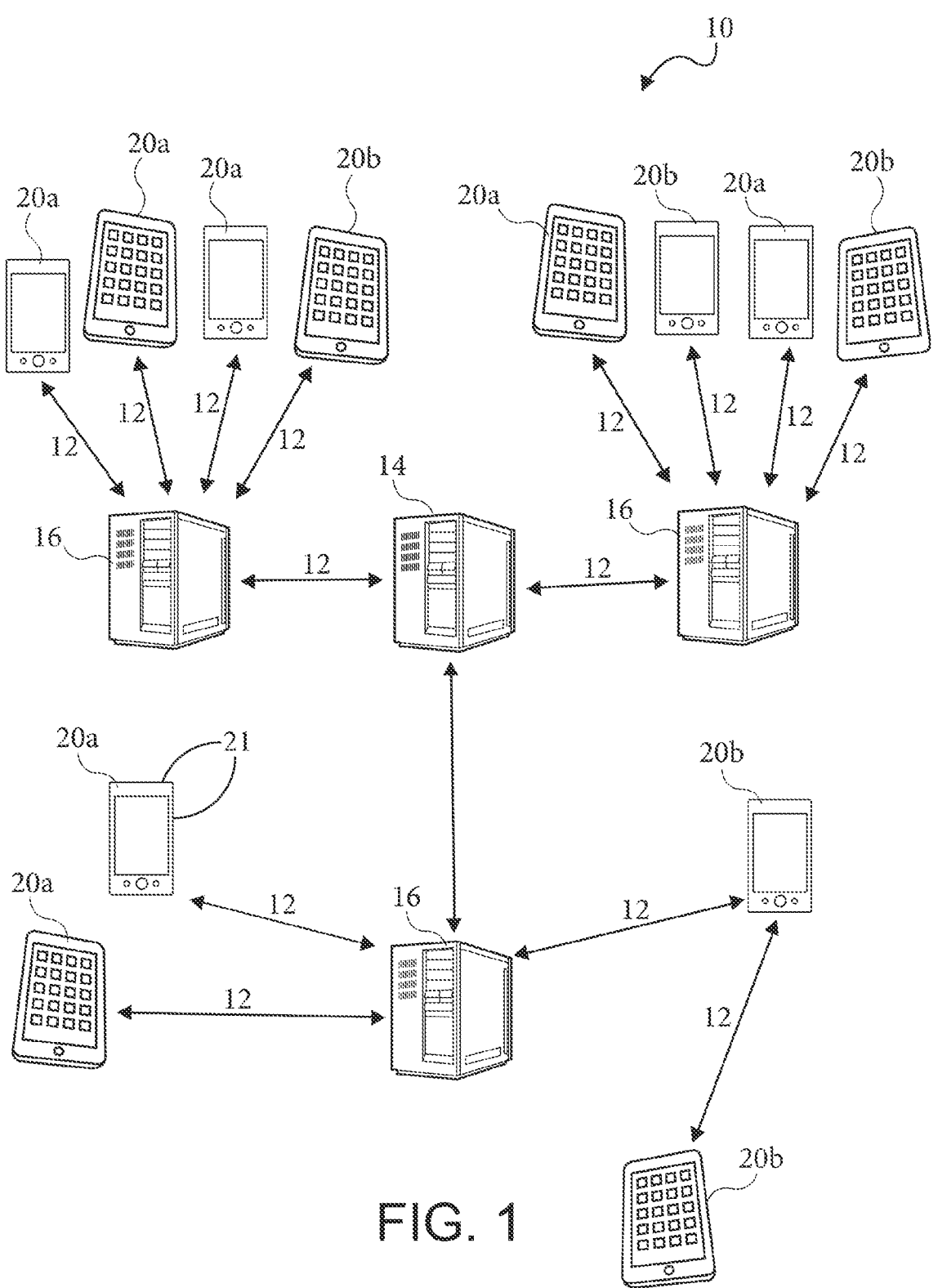
FIG. 1 illustrates various components of an exemplary system for conducting point-of-sale transactions in a low-power mobile device network according to embodiments of the present invention in block schematic form.
Figure 2:
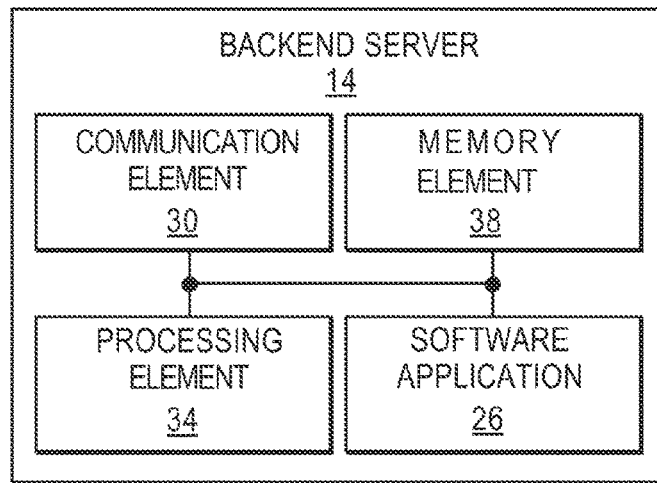
FIGS. 2 and 3 illustrate various components of exemplary servers shown in block schematic form that may be used with the system of FIG. 1.
Figure 3:
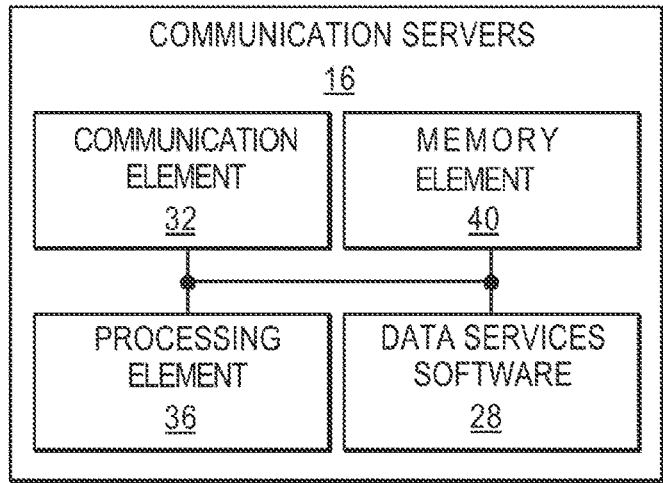

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Modern techniques for inventory and/or transaction tracking typically rely on digital scanners, barcodes, backend servers and the like for reconciling and tracking transaction, receipts, and inventory status. These require active data connections, server-level computational power, and/or significant capital for acquiring such resources. However, the technology does not scale down sufficiently for implementation in emerging market environments that frequently lack supporting resources. Critically, such retailers typically also lack the resources to affix barcodes to or otherwise encode each product and/or to acquire dedicated digital barcode scanners.

It is known that machine vision may be used to recognize objects, and that devices implementing machine vision software may be incorporated into checkout procedures at retail establishments. For example, U.S. Pat. No. 9,412,099, which is hereby incorporated herein by reference in its entirety, discloses a retail checkout system including: a scanner; an optical code reader; a camera; a magnetometer; a spectrometer; an ultrasonic sensor; a millimeter wave scanner; an item identification processor to perform a learning process that identifies groups of candidate items (or a single matched item) from among data in a database, responsive to an image from the camera; a database for maintaining features for feature matching by the item identification processor; an electronic device for communicating with a retail checkout system and other devices located in a retail facility to assist with identifying purchase items; NFC and/or RFD transceivers for communicating with transceivers attached to products; and weight sensors.

Further, U.S. Patent Publication No. 2015/0109451, which is hereby incorporated herein by reference in its entirety, discloses a retail kiosk including: a controller with a processor (for extracting features from images of a product and recognizing the object based on a predetermined model applied to the extracted features) and a memory; an imaging device configured to create the electronic images of the product; an object recognition device in communication with the controller and the imaging device; a display device and interface; an illumination device; and a storage device comprising a server. The controller fetches and executes instructions from the server and converts communications from the object recognition device into appropriate formats compatible with third-party data applications, network devices, or interfaces such as output devices, for example to allow implementation of the storage device using different technologies or by different organizations such as third-party vendors managing the storage device using proprietary technology.

Existing systems such as those outlined above are not suitable for mobile and/or low-power use. Embodiments of the present invention permit retailers in emerging markets to utilize a POS application configured to enable completion of transaction and checkout processes for product purchases (substantially as described throughout this disclosure) exclusively via a low-power mobile electronic device, i.e., without requiring the use of external barcode scanners, payment networks, concurrent active data connections, servers or other supporting infrastructure ubiquitous in existing POS systems.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for conducting low-power POS transactions. The environment may include communication links 12 for enabling electronic communications between components of the system 10. The system 10 may include a backend server 14 and communication servers 16. The backend server 14 may manage training of feature recognition software such as deep learning systems comprising and/or for incorporation into POS software applications (discussed in more detail below). The backend server 14 may also manage distribution of the POS software applications and/or feature recognition software for download by and/or peer-to-peer transfer between a plurality of low-power mobile electronic devices 20.

The mobile electronic devices 20 may conduct low-power POS transactions at least in part by utilizing the POS software applications for visual product recognition. In an exemplary embodiment, the POS transactions may be conducted without an active data connection and/or without concurrent electronic communication via communication links 12. More particularly, the POS transactions may optionally be conducted without concurrent communication with the backend server 14 and/or a payment network (as discussed in more detail below), with the electronic burdens during the transaction and checkout process borne exclusively by respective mobile electronic devices 20 without requiring the use of barcodes, barcode scanners, payment networks, servers or other supporting infrastructure ubiquitous in existing POS systems.

Each mobile electronic device 20 may optionally execute a payment application 22, as described in more detail below. Each mobile electronic device 20 executes a mobile POS application 24 including instructions for completing POS transactions alone or in conjunction with the payment application 22. In the preferred embodiment, the POS application 24 performs object recognition or otherwise identifies the product(s) involved in a transaction, and generates related transaction metadata in each case where a transaction is completed through full or partial payment by a customer. The payment application 22 may be embedded in the POS application 24.

The backend server 14 may execute a backend software application 26 for managing creation, updating and dissemination of versions of the POS application 24. The exemplary backend software application 26 may include and/or manage execution of one or more programs for training an object recognition module of the POS application, for example one or more programs developed with the assistance of libraries supporting plain linear algebra computations, traditional machine learning libraries, computer vision libraries, or the like.

Communication with the Backend

Communication servers 16 may execute data service software 28—e.g., comprising SMS gateway software—for managing data exchanges between the backend server 14 and the mobile electronic devices 20. One of ordinary skill will appreciate that the backend server 14 and the mobile electronic devices 20 may exchange data via communication links 12 without the involvement of communication servers 16 without departing from the spirit of the present invention.

Broadly, the communication links 12 may allow communication between the mobile electronic devices 20 and the servers 14, 16. In embodiments including a payment network, the links 12 may allow communication between the mobile electronic devices 20 and the payment network, for example with the assistance of respective payment terminals and/or payment applications 22. One or more of the communication links 12 may include or comprise local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the mobile electronic devices 20 may generally connect to the communication links 12 and/or to one another wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof.

Each server 14, 16 generally retains electronic data and may respond to requests to retrieve data as well as to store data. The servers 14, 16 may be embodied by application servers, communication servers, database servers, file servers, gaming servers, mail servers, print servers, web servers, or the like, or combinations thereof. Furthermore, each of the servers 14, 16 may include a plurality of servers, virtual servers, or combinations thereof. The servers 14, 16 may be configured to include or execute software such as file storage applications, database applications, email or messaging applications, web server applications, or the like, in addition to and/or in conjunction with software 26, 28.

The servers 14, 16 may apply business methods or algorithms, may utilize and/or manage lookup tables or databases, receive user input (from shopkeepers, platform moderators, data managers, engineers maintaining the platform, or other users) via one or more peripheral devices or associated systems, or perform other tasks. The backend server 14 may perform tasks in order to manage training of feature recognition software such as deep learning systems, otherwise update or upgrade POS applications 24, manage distribution of the POS applications 24 for download by and/or peer-to-peer transfer between low-power mobile electronic devices 20, and/or to perform other tasks outlined throughout this disclosure.

The communication servers 16 may perform such tasks in order to act as a secure gateway to receive, encrypt and/or forward transaction metadata, transformed transaction metadata, POS applications 24 and/or updates or upgrades thereto, and to perform other functions in response to, for example, data elements included within transaction metadata. Communications servers 16 may comprise communication links 12 and/or may act as electronic communications intermediaries between subgroups of mobile electronic devices 20 and/or the backend server 14. In an embodiment, the communications servers 16 may comprise Short Message Service (SMS) servers enabling mobile electronic devices 20 to periodically exchange SMS data with the backend server 14. Such an SMS layer may be provided through an Application Programming Interface (API) by a telecommunications provider. Mobile electronic devices 20 may utilize the communications servers 16 in conjunction with standard cellular telephone account numbers and/or SMS short codes. SMS short codes for exchanging data via the communication servers 16 may be available to retailers on flat fee plans and/or may be paid for by platform providers, for example where other data exchange services are unavailable and/or too expensive and providing the opportunity for performing larger data exchanges.

The servers 14, 16 may respectively include communication elements 30, 32 processing elements 34, 36, and memory elements 38, 40.

Figure 4:
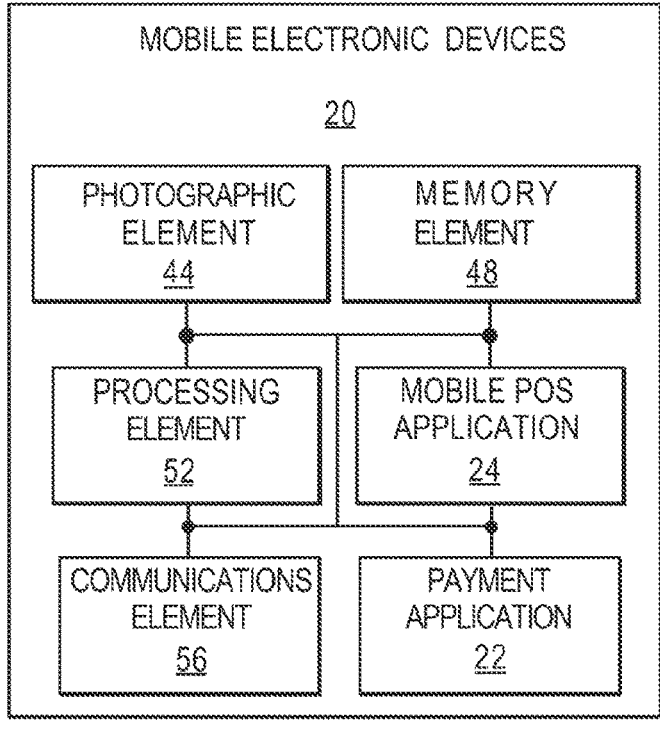
FIG. 4 illustrates various components of exemplary mobile electronic devices shown in block schematic form that may be used with the system of FIG. 1.

Each mobile electronic device 20 may be embodied by a smartwatch, a smart phone, a personal digital assistant (PDA), a tablet, a palmtop or laptop computer, a notebook, a netbook, smart glasses, wearable and non-wearable electronics (e.g., any IoT device), or other mobile device. Each mobile electronic device 20 may include a frame 21, a photographic element 44, a memory element 48, a processing element 52, software applications 22, 24 and/or a communications element 56, as seen in FIG. 4. The memory element 48 may store the software applications 22, 24, and the processing element 52 may execute one or both of the software applications 22, 24. The photographic element 44, the memory element 48, the processing element 52 and the communications element 56 may each be be fixed to and fully or partially encompassed by the frame 21.

The communication elements 30, 32, 56 may allow communication between one another and/or with external systems or devices, such as a payment network. The communication elements 30, 32, 56 may include signal or data transmitting and receiving circuits, such as antennas, amplifiers, filters, mixers, oscillators, digital signal processors (DSPs), and the like. The communication elements 30, 32, 56 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth®, or combinations thereof. Alternatively, or in addition, the communication elements 30, 32, 56 may establish communication through connectors or couplers that receive metal conductor wires or cables which are compatible with networking technologies such as ethernet. In certain embodiments, the communication elements 30, 32, 56 may also couple with optical fiber cables. The communication elements 30, 32, 56 may be in communication with or electronically coupled to memory elements 38, 40, 48 and/or processing elements 34, 36, 52.

Preferably the devices of the system 10 communicate via secure and/or encrypted communication means. For example, all or some of the backend server 14, the mobile electronic devices 20, and the communication servers 16 may utilize Secure Sockets Layer (SSL) technology for authenticating and exchanging transmissions. In the preferred embodiment, all or some of the backend server 14, the mobile electronic devices 20, and the communication servers 16 may utilize such public/private key encryption for authenticating and exchanging transmissions. In addition, the backend server 14 and/or associated web server (not shown) may implement a client authorization framework—such as OAuth 2.0—for identifying requesting mobile electronic devices 20 to a particular retailer account or the like. Such a web service API preferably utilizes enterprise-standard encryption to secure communications.

For instance, initial installation of a copy of the POS application 24 by each retail establishment may include a setup process for identifying and verifying the identity of the establishment or business (and/or of an agent in possession of the corresponding mobile electronic device(s) 20) as well as exchange of public/private key pairs between the device(s) 20 and the backend server 14. Data exchange may be limited to setup scenarios in which a data connection is available. Where no data connection is available for data exchange and/or download of versions and/or upgrades to the POS application 24, the POS application 24 may be obtained via peer-to-peer transfer (e.g., via Bluetooth® connection between devices 20) and implemented in an "offline" mode—utilizing only the received version of the POS application 24 and/or providing no uploads of transaction metadata and/or image data to the backend server 14. In such cases, sign-up (and encryption key exchange) may be implemented via SMS data exchange.

Device Description

The memory elements 38, 40, 48 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 40, 48 may include, or may constitute, a "computer-readable medium." The memory elements 38, 40, 48 may store the instructions, code, code segments, software, firmware, programs, applications, apps, services, daemons, or the like that are executed by the processing elements 34, 36, 52. The memory elements 38, 40, 48 may also store settings, data, documents, sound files, photographs, movies, images, databases, and the like.

The processing elements 34, 36, 52 may include processors. The processing elements 34, 36, 52 may include microprocessors, microcontrollers, DSPs, field-programmable gate arrays (FPGAs), analog and/or digital application-specific integrated circuits (ASICs), or the like. The processing elements 34, 36, 52 may include combinations of any of the foregoing. The processing elements 34, 36, 52 may generally execute, process, or run instructions, code, code segments, software, firmware, programs, applications, apps, processes, services, daemons, or the like. The processing elements 34, 36, 52 may also include hardware components, such as finite-state machines, sequential and combinational logic, and other electronic circuits that may perform the functions necessary for the operation of embodiments of the current inventive concept. The processing elements 34, 36, 52 may be in communication with the other electronic components through serial or parallel links that include address busses, data busses, control lines, and the like.

Each photographic element 44 may include cameras or other optical sensors and lens combinations capable of generating a live video visual feed and/or taking a picture or otherwise capturing image data. In various embodiments, the photographic element 44 may be integrated in the housing or body of the mobile electronic device 20. In other embodiments, the photographic element 44 may be a removable and/or standalone device in electronic communication with the mobile electronic device 20.

In the preferred embodiment, exemplary low-power mobile electronic devices 20 may include basic features such as one or more of: a memory element 48 comprising internal memory of up to four (4) gigabytes (GB), random-access memory (RAM) of up to one (1) GB, and/or a secure digital memory card (SD card) of up to thirty-two (32) GB; a processing element 52 comprising a multi-core processor (CPU) of up to one and six-tenth gigahertz (1.6 GHz),and a photographic element 44 comprising an optical sensor having image resolution up to five megapixels (5 MP) and/or frame rate of up to thirty frames per second (30 fps). However, "low-power" devices may have greater capacities without departing from the spirit of the present invention.

Further, the preferred embodiment includes a POS application 24 configured to enable completion of transaction and checkout processes for product purchases (substantially as described throughout this disclosure) exclusively via a low-power mobile electronic device 20, i.e., without requiring the use of external barcode scanners, payment networks, concurrent active data connections, servers or other support- ing infrastructure ubiquitous in existing POS systems. One of ordinary skill will appreciate that such transactions and/or checkout processes may also or alternatively be completed by embodiments of the present invention on higher-power devices and/or with the assistance of barcode technology, active data connections and/or the participation of payment networks or the like within the scope of the present inven- tion.

The mobile electronic devices 20 may capture and/or generate image data and transaction metadata regarding POS transactions and checkout processes. Some (or all) of the image data and/or transaction metadata may optionally be uploaded and/or transmitted to the backend server 14, as discussed in more detail below. Transaction metadata may include customer unique identifier, customer name, amount of transaction, amount tendered, amount charged to credit with the retailer, goods purchased, and/or other known data regarding each transaction. Image data may include image files, feature maps derived from image files, backpropaga- tion gradients and/or other data determined with reference to one or more deep learning systems (e.g., in embodiments employing federated learning models), other data compris- ing or relating to at least one feature of a digital image and/or metadata regarding any of the foregoing, also as discussed in more detail in connection with the preferred embodiment below.

The mobile electronic devices 20 and/or the backend server 14 may store and manage transaction metadata for each retailer, for example using common inventory, cus- tomer loyalty and/or customer credit tracking features. In a preferred embodiment, the mobile electronic devices 20 (and/or corresponding POS applications 24) are each con- figured for storage and transformation of the transaction metadata. It is foreseen, however, that the backend server 14 may also or alternatively manage storage and computations/ transformations of the transaction metadata, for example in conjunction with performing inventory, customer loyalty and/or customer credit tracking functions.

Exemplary transformations of transaction metadata include accounting computations, computations converting tendered and/or transaction amounts into corresponding loyalty currency of each retailer, addition or subtraction of all or some of transaction amounts from a ledger tracking customer credit with a respective retailer, determination of purchasing trends and/or correlations among classes of goods, addition or subtraction of units representing pur- chased goods from an inventory tracking database, supple- mentation and/or combination of transaction metadata with other available data, and other known shop management computations.

In an embodiment, the backend server 14 may make transaction metadata and/or transformed transaction meta- data available for access by the mobile electronic devices 20 via an API. For example, the backend server 14 may store the transaction metadata and/or transformed transaction metadata in a database (e.g., using a database management system), and may make the data available via API to a web server (not shown) for transmission in response to authen- ticated requests from the mobile electronic devices 20. In an embodiment, raw and/or transformed transaction metadata is transmitted by mobile electronic devices 20—for example, whenever active data connections are available and/or in batches periodically via SMS protocols—to the backend server 14.

In the preferred embodiment, the mobile electronic devices 20 and/or POS applications 24 are configured to obtain authorization for sending SMS messages from a retailer or operating system. Each POS application 24 may include instructions for periodically checking availability of an active data connection and, in the event such a connection is not available, storage of transaction metadata locally on the corresponding memory element 48 (i.e., in batches). The POS application 24 may further include instructions to periodically transmit one or more batches of the transaction metadata via SMS protocol to one or more of the commu- nication server(s) 16—for example, using a short code—for forwarding to the backend server 14. Various compression and encoding schemes can be used for such data exchange. A simple exemplary protocol encodes data that would ordi- narily be transferred through an HTTPS POST request in JSON or XML format into a binary string. The string may be further encoded into plain text (e.g. using a Base64 encoding scheme) and encrypted. Encryption may be facili- tated via a regular public/private key mechanism or other- wise as outlined hereinabove.

The backend server 14 may consume the transaction metadata to perform inventory, customer loyalty, customer credit tracking and/or similar functions, and may make corresponding transformed transaction metadata available to the mobile electronic devices 20 for download via the API of the backend server 14. It is also foreseen that the backend server 14 may transmit transformed metadata and/or trans- formed transaction metadata to one or more ad servers (not shown) or the like configured to match the data against advertisements, and that such advertisements may be trans- mitted to corresponding retailer mobile electronic devices 20, without departing from the spirit of the present inven- tion.

Exemplary Pos Device and Method of Use

Figures 5A, 5B:
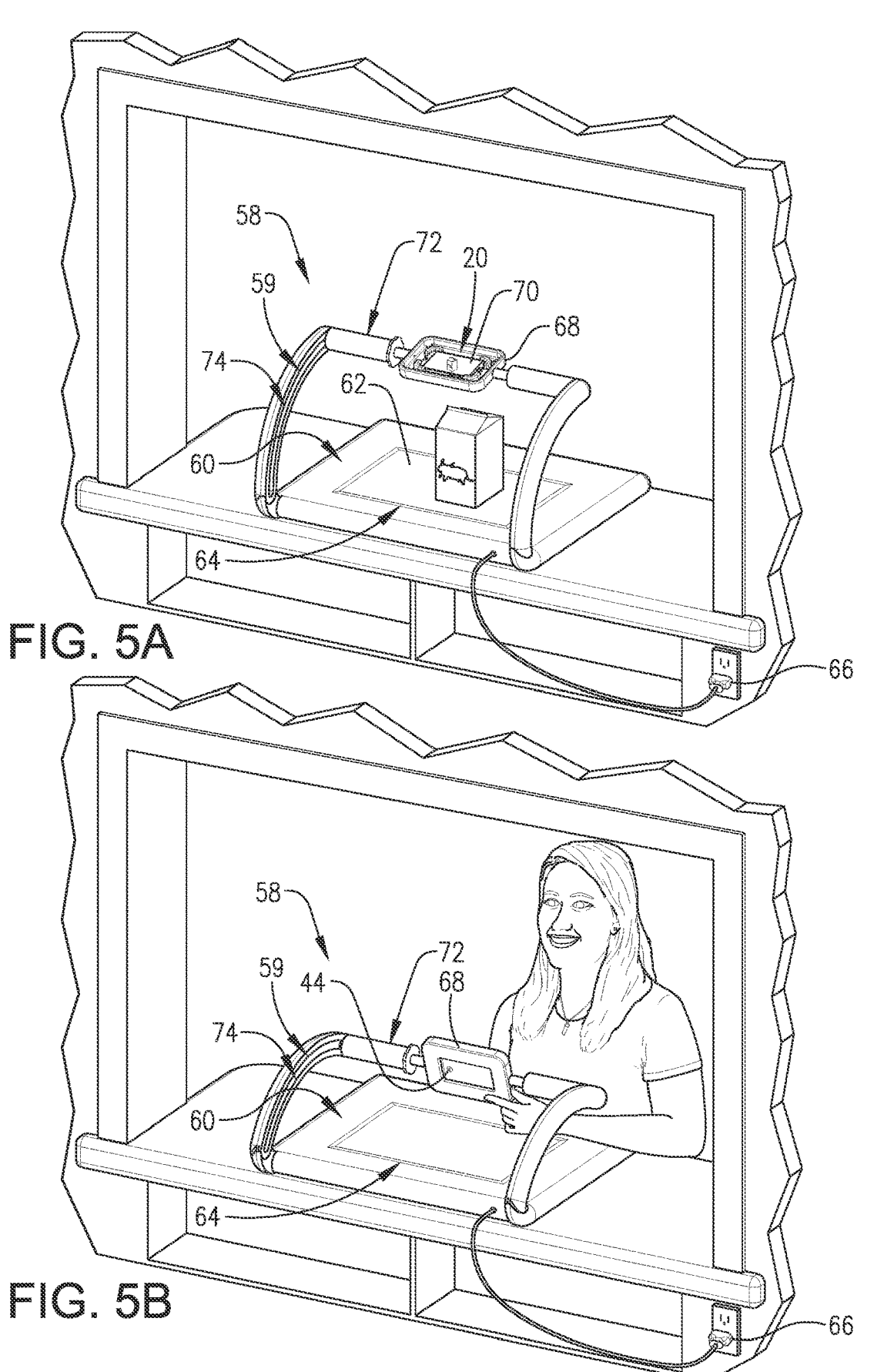
FIGS. 5A and 5B illustrate an exemplary low-power stand for mounting the exemplary mobile electronic device of FIG. 4 and for positioning a saleable product to be captured by the mobile electronic device.

Turning to FIG. 5, each mobile electronic device 20 may comprise a POS device alone or together with a stand 58. Where a stand 58 is employed, it will be appreciated that the mobile electronic device 20 may be removed from the stand 58, for example to enable scanning of larger products. The stand 58 may include a frame 59 comprising a suitable low-cost material such as cardboard. The illustrated frame 59 comprises a plastic. The stand 58 may also include a bed 60 made from a moisture-resistant, durable material (such as plastic) that may be wiped down without deformation and/or degradation. Preferably, a top surface 62 of the bed 60 comprises non-reflective material such as plastic resin(s), polyethylene, polypropylene and/or acrylic sheets.

Photographic element(s) 44 of the mobile electronic device 20 may be configured to capture frames in an asymmetric aspect ratio. The stand 58 is preferably config- ured to mount or receive the mobile electronic device 20 in an orientation that maximizes the amount of the scanner bed 60 that is visible to the photographic element 44. Because available counter space may be limited in an emerging market retail establishment, and/or because many mobile electronic devices 20 have default landscape image orien- tation positions, the stand 58 is preferably configured to mount the mobile electronic device 20 in landscape position.

The bed 60 preferably comprises a reference shape such as a rectangular frame that may be consistently and accu- rately identified—e.g., when products of various shapes, sizes and orientations are placed on the bed 60—by feature recognition capabilities of the POS application 24. The reference shape may be used for registration or size com- parison.

The stand 58 may also include a weight scale 64—e.g., a digital scale—for measuring weight of products placed on the bed 60. In some embodiments, the scale 64 is connected to the mobile electronic device 20 via a wired (e.g. micro-USB) or wireless (e.g. Bluetooth®) connection, and provides weight data to the POS application 24 in support of product recognition processes discussed in more detail below. In other embodiments, a mechanical scale may be used. Mechanical output may be communicated to the mobile electronic device 20 via a visual indicator (not shown) visible to the photographic element 44 and interpretable by the POS application 24, through a mechanical interconnection that translates weight changes into rotation of the mobile electronic device 20 that can be detected an accelerometer (not shown) of the mobile electronic device 20 and translated into a corresponding weight of the product, and/or by other means. In some embodiments of the stand 58, a center scale integrated into a scanner bed may be removable and replaceable with a fitted block, making the scale available as a separate "upgrade" to the stand.

The stand 58 preferably also includes a port such as a micro USB port (not shown) and associated wiring for charging the mobile electronic device 20. The stand 58 preferably includes an A/C plug 66 and associated wiring and/or a battery compartment with inverter (and associated wiring) for powering the scale 64 and/or charging the mobile electronic device 20. It is also foreseen that a photovoltaic array (not shown) may be positioned in the vicinity of a retailer, and may provide charge to power the scale 64 and/or mobile electronic device 20 without departing from the spirit of the present invention.

The stand 58 preferably includes a holder 68 positioned at an angle that provides the photographic element 44 with an angled field of view, yielding a view of at least two sides of a quadratic reference product (e.g. a milk carton), and also providing an agent of the retailer (i.e., a "shopkeeper") with a clear view of a display and/or user interface 70 of the mobile electronic device 20. The holder 68 may be sufficiently distant from the bed 60 to allow for optimal "swiping estate," i.e., space between the holder 68 and the bed 60 within which the shopkeeper may hand products to a customer.

The holder 68 may also be configured to secure the mobile electronic device 20 in place, for instance via a securement structure (not shown) such as a retractable flange or the like. The securement structure of the holder 68 may be configured to be locked manually and/or in response to a digital instruction (e.g., issued from the mobile electronic device 20 via Bluetooth® and/or wired connection) for locking the mobile electronic device 20 in place for security purposes. The holder 68 may be configured to secure mobile electronic devices 20 of varying dimensions, and may be adjustably positioned along the stand 58 to permit movement and/or adjustment of photographic element 44 position and/or orientation. For example, the holder 68 may be configured to flip to turn the display 70 to face a customer, for example to review a price calculation. In addition, the stand 58 may include an arm 72 carrying the holder 68, the arm 72 being adjustable along a track 74 cooperatively defined in opposing segments of the frame 59 on either side of the arm 72. The track 74 may form a friction fit over a bearing (not shown) on each side of the arm 72 to permit selective adjustment of the arm 72 by sliding against resistance along the track (e.g., to permit the mobile electronic device 20 different viewing angles). It is foreseen that a stand may otherwise releasably hold an arm adjustable therealong without departing from the spirit of the present invention.

The POS application 24 may include a barcode scanning module, an object recognition module, and a transaction management module. The barcode scanning module may be implemented substantially in accordance with barcode recognition software known in the art. For example, the barcode scanning module may be implemented and configured using the barcode software development kit (SDK) made available by Accusoft Corporation under BARCODE EXPRESS™ for Mobile as of the date of initial filing of this disclosure. Barcode recognition may also or alternatively be implemented using another standard barcode detection algorithm or toolkit such as those made available in the library and/or Barcode Scanner API offered by Google LLC under the mark Android MOBILE VISION™ as of the date of initial filing of this disclosure.

The transaction management module may be configured to manage: shopkeeper sign-in; digital "shopping cart" initiation and population; customer identification, customer record lookup (e.g., using name, phone number, and/or barcode and/or quick response (QR) code(s)) and customer account summary display; customer credit lookup and updating; customer loyalty currency credit lookup, updating and expenditure; addition/registration of new customer(s); selection of product identification mode; user inputs from and prompts to the user interface 70; execution and termination of the barcode scanning and object recognition module processes; output of the barcode scanning and object recognition modules, including by generating user prompts for adjusting product and/or photographic element 44 positioning in response to such outputs and/or selecting from among candidate products, populating the display with identified products, or the like; receiving and displaying payment information; permitting shopkeeper and/or customer manipulation of transaction metadata relating to the customer; managing inventory data; other known checkout, payment, shopkeeper and/or customer data management processes and/or combinations of any of the foregoing.

The object recognition module may include feature extraction code. For example, the feature extraction code may be configured to operate on one or more frames recorded by the photographic element 44 using one or more engineered feature extraction methods such as SIFT, VLAD, HOG, GIST and/or LBP. The feature extraction code may also or alternatively be configured to operate on the one or more frames using one or more representation learning methods such as Sparse Coding, Auto Encoders, Restricted Boltzmann Machines, PCA, ICA, K-means, and/or deep learning systems.

The preferred embodiment of the object recognition module implements a convolutional neural network-type deep learning system, as discussed in more detail below. Generally, the object recognition module performs a classification operation in which features are extracted from the image(s) captured by the photographic element 44, and a computation is performed on the extracted feature(s) (which may involve stored feature data relating to known products (or "classes")) to derive a mathematical measure of class probability or class similarity that may be used for classification purposes (i.e., identification of products for sale from a shopkeeper's inventory).

During a checkout process, the transaction management module of the POS application 24 may offer (i.e., by generating instructions for display of a corresponding prompt) a shopkeeper the option of choosing between barcode mode, object recognition mode, and a hybrid mode implementing at least a portion of the functionality of both the barcode and object recognition modes, as described in more detail below. In any mode, the transaction management module may instruct the processing element 52 of the mobile electronic device 20 to display crosshairs or other product/image capture alignment guides (see, e.g., the "Camera Viewfinder" of FIG. 6) at the display 70. The guide graphics may be displayed continuously—allowing barcodes and/or extractable features to be swiped into alignment with the guide graphics indiscriminately and in the shopkeeper's and/or the customer's discretion—and/or the guide graphics may appear and disappear (or otherwise flicker and/or discolor) in response to manual commands and/or completion of product recognition events.

For instance, guide graphics may be continuously displayed until a product is recognized by the barcode scanning module and/or the object recognition module, which may trigger the transaction management module to instruct issuance of an audible alarm and/or a graphic indicator at the display 70 to indicate product recognition. Also or alternatively, where barcode and/or object recognition processes produce multiple candidate products for selection by the shopkeeper and/or customer, the transaction module may instruct display of a corresponding prompt requesting manual selection from among the candidate products.

Figures 6A, 6B, 6C:
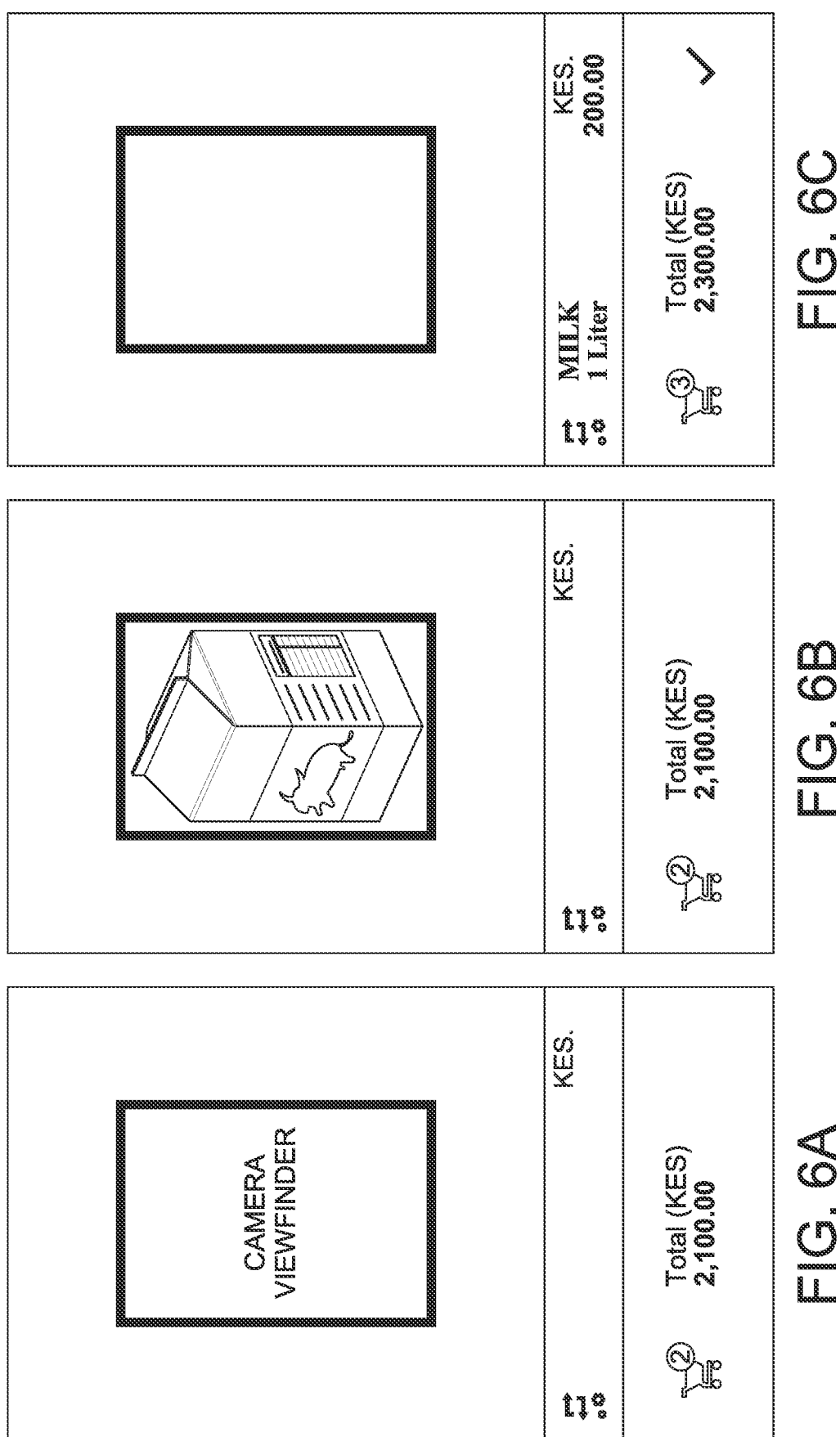
FIGS. 6A to 6C illustrate various graphical user interfaces generated by an exemplary point-of-sale application for alignment of the product with a photographic element of the mobile electronic device of FIG. 4 and addition of the product to a shopping cart.

Turning to FIG. 6, an exemplary POS application 24 may maintain a record of products identified during a checkout process for a given customer, and the products may be visually represented as a group at the display 70 in the form of a shopping cart icon. Shopping cart icons and groupings—as well as the ability to select the icon to display a full list of current products populating a shopping cart—are well known in the art. As noted above, the POS application 24 may be configured to instruct display of an exemplary guide graphic labeled "Camera Viewfinder" in the middle of the display 70, as illustrated in FIG. 6a. Display of the guide graphic may signal readiness of the POS application 24 to add one or more products to the shopping cart. The shopkeeper may pass a product—as illustrated, a carton of milk—into alignment with the guide graphic, as shown in FIG. 6b. In the preferred embodiment, the shopkeeper will place the product on the bed 60 of the stand 58 in order to bring the product into alignment with the guide graphic.

The object recognition module of the POS application 24 may perform a recognition process based on one or more frames captured by the photographic element 44, as discussed in more detail below. The object recognition module may pass a plurality of classes (i.e., candidates or potentially matching products) to the transaction management module as output of the recognition process. The transaction management module may prompt the shopkeeper and/or the customer to manually select the correct product from among the plurality of classes. The display 70 may be configured as a touchscreen for receiving manual input from the shopkeeper.

Upon receiving manual selection of a product from among the plurality of classes presented to the shopkeeper, the transaction management module may be configured to record the correct quantity of the product to the group of products held in the shopping cart. The selected product and its associated cost may be displayed following placement of the product in the shopping cart, optionally in conjunction with a current shopping cart total, and the product may be removed from alignment with the guide graphic so that a next product may be captured, as illustrated FIG. 6c.

It is foreseen that a graphic guide may be omitted without departing from the spirit of the present invention, it being understood that the implementation of a graphic guide may be unnecessary in embodiments employing a particularly robust object recognition module, fewer product classes, or other aspects providing enhanced accuracy of the object recognition module.

One or ordinary skill will appreciate that various known processes may be implemented with embodiments of the inventive concepts disclosed herein, for example where the shopkeeper is offered the option of selecting a quantity of an identified product in connection with recording same to the shopping cart. For another example, one of ordinary skill will appreciate that manual selection from among a group of candidate products may be unnecessary for products to be placed in the shopping cart, the object recognition module output preferably being sufficient to identify a single product for addition to the shopping cart without the need for manual selection.

Where weight measurement according to embodiments of the present invention employing a scale 64 fails and/or in embodiments omitting the scale, the transaction management module may recognize each instance in which a price definition for an identified product requires a weight, and may generate a prompt for manual entry of same. Further, the POS application 24 may be configured with known convenience features accessible throughout checkout processes, including by enabling the shopkeeper to select products to remove from the shopping cart, to "void" one or more transactions, to "close" the shopping cart or otherwise consummate a payment transaction in respect of the products in a shopping cart, or the like. Previous determinations and/or actions may also be removed or "undone" within the scope of the present invention. Preferably, the POS application 24 is configured to record removed and/or "undone" actions for error analysis and processing.

In an embodiment, the POS application 24 may be placed in barcode mode and/or hybrid mode, as outlined above. The product may be placed in alignment with the guide graphic, and image frames may be analyzed by the barcode recognition module initially and/or in parallel with the object recognition module. For example, the frame(s) may be analyzed in a first thread by the barcode recognition module in parallel with analysis of the frame(s) by the object recognition module in a second thread. The relative framerate or priority provided to these threads may be altered. For example, if the object recognition module identifies the presence of a barcode, the POS application 24 may give higher priority and devote more frames to barcode-based recognition by the barcode recognition module. For another example, the barcode recognition module may run exclusively following a determination by the POS application 24 that a barcode scan is being attempted, and the object recognition module may run after elapse of a predetermined period of time without successful barcode recognition. Also or alternatively, the transaction management module may prompt the shopkeeper to reposition the product if barcode recognition fails, for example upon elapse of a predetermined period of time following partial barcode-recognition without successful product identification.

The object recognition module may control the threads according to a control logic. The control logic of the POS application 24 may be configured to prioritize determinations of the barcode recognition module—where a barcode is available—because of a higher anticipated likelihood of accuracy of such determinations as compared against classifications outputted by the object recognition module. According to this control logic, an output determination by the barcode recognition module may signal the object recognition module to terminate the thread of the object recognition module for the product (i.e., for the corresponding frames captured by the photographic element 44) in question. However, because determinations by the object recognition module may be generated more quickly than determinations by the barcode recognition module, the object recognition module may be prioritized to maximize scanning throughput by foregoing barcode analysis if the object recognition module completes a classification. Further, if the object recognition module generates an output of a plurality of product candidates, the control logic may cause the transaction management module to instruct generation of a prompt the shopkeeper to manually input an indication of whether the product has a barcode that may be scanned and/or of which of the plurality of product candidates matches the product in question. Still further, in an embodiment the barcode recognition module may only be executed if triggered by a barcode presence output from the object recognition module.

The control logic may also prioritize resources allocated and/or analysis conducted between the barcode scanning and object recognition modules, for example by increasing the relative frame rate (e.g., frames per second) analyzed by the barcode scanning module when a partial barcode is identified by one or both of the object recognition module and the barcode recognition module. Generally, resources may be prioritized by the control logic with the goal of reaching a product identification of a threshold accuracy within the shortest possible period of time and/or with the least expenditure of resources and/or with the lowest electronic burden.

One of ordinary skill will appreciate that management of frames captured by the photographic element 44, and correlation of corresponding shopkeeper manual inputs and the like, is important for proper management of a checkout process. For example, the POS application 24 is preferably configured to timestamp frames captured by the photographic element 44 and manual inputs by the shopkeeper (and/or customer) for association with one or more products undergoing identification processes during checkout. Also or alternatively, the transaction management module may be configured to bookend inputs to the mobile electronic device 20, the bookends comprising bookend events such as inputs (e.g., frame captures and/or manual inputs) signaling the beginning and the end of each product recognition process. For instance, the shopkeeper may manually input a selection and/or may clear the bed 60 of the stand 58 and bring another product into alignment with the graphic guide, in each case signaling to the transaction management module the beginning of a new product recognition process. The end of the product recognition process (for the product being scanned) may be signaled by recording same in the shopping cart. The end of each product recognition process may also trigger issuance of a confirmatory visual and/or auditory alert to the shopkeeper by the mobile electronic device 20. Such feedback may include a "beep" sound, a vocalization of the corresponding product name, a visual flash, and/or a display of the product name and/or brand. The inputs (i.e., frames and/or manual input) received by the mobile electronic device 20 during the intervening time frame may be assumed to relate to recognition of the product recorded to the shopping cart.

It is foreseen that inputs may be alternatively managed— for example using tagging and/or indexing tools—without departing from the spirit of the present invention. In an embodiment, the transaction management module is preferably configured to manage recognition of multiple products aligned with the graphic guide or otherwise appearing in an image frame captured by the photographic element 44 simultaneously. Robust embodiments of the transaction management and object recognition modules may be configured to track multiple products simultaneously by tracking movement of products into and out of the image frames captured by the photographic element 44—for example through reliance on an "objectness" output of the object recognition module, which represents the likelihood of a given frame containing a product to be scanned, as opposed to the scanner bed or other background, as outlined below— and recording each corresponding positive identification and placement within a shopping cart against the tracked products. In this manner, the POS application 24 may be configured to avoid duplicative counting of a single product as it moves through multiple frames in a single swipe or pass through the line of sight of the mobile electronic device 20. Preferably, such product tracking also reduces the need for tracking bookend events and/or timestamp correlations as outlined above. One of ordinary skill will appreciate that several methods for distinguishing between products and/or tracking recordation to the shopping cart (or the like) are available for use within the scope of the present invention.

In a preferred embodiment, at least one frame (image), or feature data extracted from the frame, associated with a product recorded to a shopping cart is at least temporarily stored (e.g., on the memory element 48) along with product identification (e.g., product class) and other transaction metadata. The image(s)/feature(s) and associated data may be used to retrain an updated version of the POS application 24, as discussed in more detail below.

The POS application 24 may also be configured to manage instances of failed product recognition or "anomalies" (i.e., whenever a barcode and/or image including other product features does not find a match to a class known to the POS application 24). For example, each time a product belonging to a class unknown to the POS application 24 is scanned, the object recognition module may be configured to record corresponding image frames and transaction metadata for later handling. The transaction management module may permit addition of such product(s) to the shopping cart—as well as consummation of the corresponding transaction(s)—via manual input by the shopkeeper of critical value(s) (such as price for the product(s)). In an embodiment where the anomalous product is identified by a barcode, the POS application 24 may be configured to save the price and frame(s) capturing the barcode, permitting recognition of the previously anomalous product by the barcode scanning module in future transactions. The POS application 24 also preferably is configured to update the object recognition module to add the anomalous product as a new class of the module, as discussed in more detail below.

Exemplary Object Recognition Module

Overview

Existing object recognition software typically does not scale down effectively for implementation in emerging market environments (and/or on low burden mobile electronic devices 20) that frequently lack supporting data transfer services, infrastructure and/or requisite capital for acquisition and operation. Embodiments of the present invention include an unexpectedly effective object recognition module comprising a pipeline including convolutional neural network (CNN) 100 illustrated in FIG. 7 and described in more detail below. Preferably, the CNN 100 comprises a depthwise separable network or another architecture optimized for fast inference. The preferred object recognition module CNN 100 may be implemented with the embodiments disclosed elsewhere herein. Moreover, it is foreseen that other object recognition modules may be utilized without departing from the spirit of the present invention.

The CNN 100 may be integrated into an object recognition pipeline that generally proceeds in the following steps: (1) continuous image capture produces an input image; (2) preprocessing produces a registered image $x_t$ and may utilize data from time-steps<t for computing other metadata; (3) hybrid classification performs a product output and/or class confidence scores $C(x_t)$ and may take into account additional data, such as weight information or the location of a reference shape for comparison; and (4) moving-average or exponential-decay filtering and thresholding may provide a final classification result.

$$F(\{C(x_t),C(x_{t-1}), \ldots \})\in\{none,$$
$$unknown\}\cup\{product_1, \ldots product_K\}$$

It is foreseen that step (3) may be performed by the CNN 100 or the CNN 100 in conjunction with an object recognition module. Additional steps may, for convenience, be implemented as nodes within the computational graph representing the CNN 100. Any combination of these steps, including inference of the CNN 100, may be used in conjunction with an object recognition module, which may in turn use other sub-modules (such as a barcode reading module), without departing from the spirit of the present invention.

In a simple embodiment, the POS application 24 is limited to product recognition of few (e.g., one) image(s) at any given time. In an embodiment, such a limitation may be addressed, at least in part, by utilizing groupings of a small number of products in individual classes for products commonly sold together (e.g. '1 egg', '2 eggs', '3 eggs', and so on). Other heuristics, such as sliding-window classifiers or pre-pended region-proposal networks/algorithms may also or alternatively be used to address the limitation, though product bounding box annotated data should preferably be used for same. Nonetheless, scanning a single product at a time remains a practical option in a retail setting where accuracy and speed are often more important than bulk checkout and, empirically, reduces the likely size of any CNN 100 required to perform object recognition according to embodiments of the present invention because single product-scanning may eliminate or reduce the need handle occlusions.

Referring in more detail now to step (2), known preprocessing techniques may be applied to all or some frames of the training data. For example, each camera input image may be transformed to RGB color space. Depending on the physical setup of system equipment, all or some of the images of the training data may be cropped. For example, in some embodiments, size requirements such as 299×299 or 224×224 may be observed. In an embodiment, full advantage may be taken of the available camera frame size by transforming image(s) with nearest-neighbor interpolation, depending at least in part on the classifier's input.

Preprocessing may also include recognizing a canonical reference shape (e.g., of the bed 60) using known shape identification techniques (e.g., color filtering, erosion/dilution, feature key-point extraction, etc.). A location of the reference shape may be used to register image(s) of the training data by performing a projective transformation and/or the location may be passed on to the CNN 100 (i.e., to one or more classifier(s)) as additional metadata.

Following registration, frame-interdependent lighting correction may be performed. Finally, a canonical mean image generated from the training data may be calculated:

$$\frac{1}{N}\sum_{i=1}^N x^{(i)}$$

The canonical mean image may be subtracted and the data may be divided to have unit variance in a specified integer range. Further, a lightweight optical flow algorithm may be used to pre-filter frames of the training data to "skip" or omit from training—for example, because a change from a previous frame is considered insufficient—to move on to the filtering step.

CNN Architecture

Referring in detail now to the CNN 100 used as part of an object recognition pipeline, the CNN 100 may include hidden layers 102a through 102n, where "n" represents the number of hidden layers of the CNN 100, at least one fully-connected layer 104, and K output class probabilities. K may represent the number of classes known to the network (e.g., corresponding to the number of products the network is trained to recognize). Class probabilities may be derived from a function that provides for probabilistic interpretability of K output class scores (e.g., Softmax).

Each hidden layer 102 preferably includes one or more convolutional layers, an activation function unit (e.g. rectified linear unit (ReLU)) layer, and a pooling layer. The convolutions may be configured such that pooling layers may be omitted, in particular in depth-wise separable fully convolutional networks. Further, the CNN 100 preferably also utilizes trained quantization and/or model compression (e.g., Huffman Coding) to provide a workable network for implementation on low-power mobile electronic devices 20, as discussed in more detail below. Importantly, in the preferred embodiment the CNN 100 may use multiple output arms and sub-networks to perform different tasks, substantially sharing convolutional features in their computation. For instance, in the illustrated preferred embodiment, functions $g_1$ to $g_4$ act on output of various of the hidden layers 102 to provide multi-objective functionality to the POS application 24 according to embodiments of the present invention described in more detail below.

More generally, CNN 100 provides a powerful, generalizable, and highly accurate building block for object classification tasks. Referring to functions $g_1$ to $g_4$, the preferred CNN 100 is expanded to re-use hidden representations of products (i.e., hidden layer outputs) following multiple convolutional layers for performing a variety of tasks simultaneously, including, for example: (1) object classification via $g_1$, (2) "objectness" detection via $g_2$ (i.e., a less nuanced conclusion regarding whether a frame includes a product to be classified or instead comprises a "background class" image including, for example a tray table of a scanner or some other background object(s)), (3) barcode detection via $g_3$, and/or (4) representational learning via $g_4$ (i.e., object classification and/or quick-add representational learning for anomalous product classes, as described in more detail below). CNN 100 preferably identifies products without an active internet connection, with classification occurring exclusively on the mobile electronic device 20.

More particular exemplary architecture of the CNN 100 will now be described. The most basic aspects of the CNN 100 may be constructed in accordance with one or more known base networks used for object classification tasks. For instance, the architectures proposed by any one of the following—collectively referred to as the "prior art base networks," each of which is incorporated herein in its entirety by reference—may be incorporated into the CNN 100 without departing from the spirit of the present invention: MobileNet v1 and/or MobileNet v2 (Howard, Andrew G., Zhu, Menglong, Chen, Bo, Kalenichenko, Dmitry, Wang, Weijun, Weyand, Tobias, Andreetto, Marco, Adam, Hartwig. "MobileNets: Efficient Convolutional Neural Networks for Mobile Vision Applications." Arxiv.org. Google, Inc. Jul. 8, 2018 (https://arxiv.org/pdf/1704.04861.pdf)); ShuffleNet (Zhang, Xiangyu, Zhou, Xinyu, Lin, Mengxiao, Sun, Jian. "ShuffleNet: An Extremely Efficient Convolutional Neural Network for Mobile Devices." Arxiv.org. Megvii Inc. Jul. 8, 2018 (https://arxiv.org/pdf/1707.01083.pdf)); and/or efficient variants of NasNet (Zoph, Barret, Vasudevan, Vijay, Shlens, Jonathon, Le, Quoc V. "Learning Transferable Architectures for Scalable Image Recognition." Arxiv.org. Google Brain. Jul. 11, 2018 (https://arxiv.org/pdf/1707.07012.pdf)), ResNet (Xie, Saining, Girshick, Ross, Dollár, Piotr, Tu, Zhuowen, He, Kaiming. "Aggregated Residual Transformations for Deep Neural Networks." Arxiv.org. UC San Diego and Facebook AI Research. Jul. 8, 2018 (https://arxiv.org/pdf/1611.05431.pdf)) and/or Inception (Alom, Zahangir Md, Hasan, Mahmudul, Yakopcic, Chris, Taha, Tarek M. "Inception Recurrent Convolutional Neural Network for Object Recognition." Arxiv.org. University of Dayton and Comcast Labs. Jul. 8, 2018 (https://arxiv.org/pdf/1704.07709.pdf)). For larger network choices like Inception, ResNet, or large variants of NASNet, knowledge distillation may be performed to train a smaller representational network to approximate the proposed larger teacher network, for example, as outlined in the paper entitled "Distilling the Knowledge in a Neural Network." (Hinton, Geoffrey, Vinyals, Oriol, Dean, Jeff. Arxiv.org. Google, Inc. Jul. 8, 2018 (https://arxiv.org/pdf/1503.02531.pdf)).

Prior art base networks may be modified according to the teachings set forth herein to form the CNN 100 by, for example, balancing tradeoffs in speed and classification accuracy on a benchmark dataset, e.g. as characterized by a depth multiplier a and a resolution multiplier $\rho$ in the case of MobileNet. In an exemplary embodiment, downstream compression may be implemented, including trained quantization as discussed below, and the following parameters suffice: $\rho = \alpha = 1.0$, corresponding to an input size of 224×224 and a network with approximately 4 million model parameters. In this exemplary embodiment, inferences times of <500 ms may be achieved in trials on mobile electronic devices 20 common in emerging markets. Moreover, smaller versions (e.g., with fewer trainable model parameters) may be trained and used to support even lower power classification operations.

Turning again to FIG. 7, any of the terminal hidden layers 102 of the CNN 100 may provide a convolutional feature representation. Given input image x, the feature representation may be represented by $\hat{f}(x) \in R^m$.

Methods for transforming an ordinary base network to the a network capable of performing multiple tasks for low-power product recognition are now described. In ordinary classification, a last fully-connected layer 104 typically performs a single matrix multiplication and bias addition substantially as follows:

$$h_{logit} = h_1(\hat{f}_1(x)) = M \hat{f}_1(x) + b$$

M and b may be represented in the foregoing equation as follows: $M \in R^{m \times K}$ and $b \in R^K$ where K is the number of output classes (products). This is equivalent to 1×1 convolution of K channels when the input has dimension 1×1×m and rows of M form the convolutional kernels, with CNN 100 forming a full convolutional network. The exemplary logits are passed through a non-linearity that yields interpretable class probability scores, such as a Softmax function:

$$p(j) \approx \text{softmax}\,(h_{logit})_j = \frac{e^{h_{logit,j}}}{\sum_{i=1}^{K} e^{h_{logit,i}}}$$

We may denote this "ordinary" classification as the output $g_1$ as $g_1(x) = (h_1 \circ f_1\hat{\ })(x)$, where $g_1$ may generally be regarded as the first or 'original' arm of the CNN 100. Taking the equation above, $g_1$ may be represented as follows:

$$g_1(x) = \text{softmax}\,(M\hat{f}_1(x) + b) \in [0,1]^K$$

In embodiments of the CNN 100 incorporating multi-objective tasking, one or more additional functions $g_2$ to $g_4$ may be added on the output of one or more corresponding hidden layers of the CNN 100, $f_1$ to $f_4$ to achieve different functions. For instance, where a MobileNet v1 prior art base network is employed with CNN 100, a second-to-last layer may be represented by $f_1\hat{\ }(x) \in R^{1 \times 1 \times 1024}$. Accordingly, an additional arm may be added to a computational graph representing the CNN 100 in order to distinguishing between the presence or absence of a product to be classified, ("objectness recognition"). For example, $g_2$ may be formulated as solving an ordinary two-class classification problem (i.e. as a logistic regression classifier) on the output from another hidden layer $f_2$:

$$g_2(x) = \text{sigmoid}\left(w^T \hat{f}_2(x) + b_2\right) = \frac{1}{1 + e^{-w^T \hat{f}_2(x) + b_2}}$$

Similarly, an additional arm corresponding to the barcode recognition feature of the object recognition module may be appended to the computational graph representing the CNN 100. For example $g_3$ may implement a binary barcode presence detector for an input image, and may similarly be represented as a binary classifier:

$$g_3(x) = \text{sigmoid}(\text{barcode-network}[\hat{f}_3(x)])$$

Finally, an additional arm corresponding to an embedding representation configured for anomaly detection, category identification and/or classification for the POS application 24 may be appended to the computational graph representing the CNN 100, as represented by $g_4$. It should be noted that category identification and/or classification functions of this third additional arm may be duplicative of those functions represented by operation of $g_1$, and that $g_4$ may be utilized in some embodiments as an alternative to the operations associated with $g_1$. In general, $g_4$ may be represented as another sub-network:

$$g_4(x) = \text{representation-network}[\hat{f}_4(x)]$$

One of ordinary skill will appreciate that one or more of the functions $g_1$ to $g_4$ may be alternatively defined within the scope of the present invention, it being generally understood that loss measurement according to the features described below may be achieved through implementation of a variety of functions. It is also foreseen that the three additional arms of the CNN 100 may each include dedicated sub-networks comprising additional convolutional and other layers that may, for example, comprise model parameters that are not transfer-learned but instead are first initialized during training. Alternatively, no such sub-networks are required in some embodiments of the disclosed invention. As a particular example, the arm corresponding to $g_4$ may correspond to the identify function (i.e., $g_4(x)=\hat{f}_1(x)$) and may simply represent an output node characterized by the loss optimized during training, as further described below.

One of ordinary skill will also appreciate that each of the arms may be utilized to perform one or more tasks. One of ordinary skill will also appreciate that the arms may originate with the same hidden layer representation (or output), therefore relying on the same $\hat{f}(x)$, it being understood that locating the arms to optimize performance without unacceptable loss of accuracy in respective tasks may not be desirable in all applications. In more general notation, the subscript from $\hat{f}$ is dropped, noting that each function $g$ relates to features extracted through some $\hat{f}$ which may or may not be the same.

Figure 7:
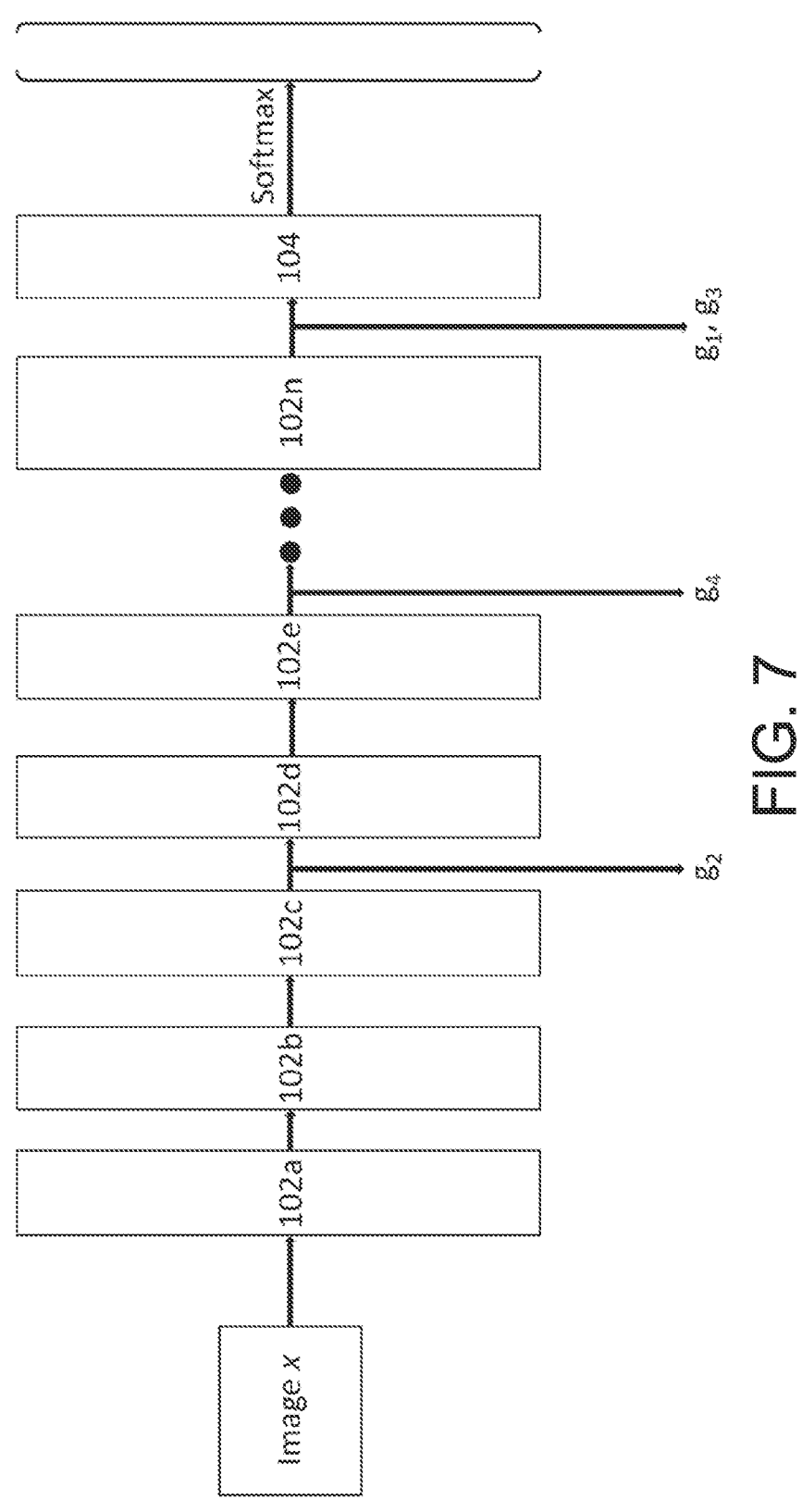
FIG. 7 is a flowchart of various components of an exemplary convolutional neural network of an object recognition module utilized in POS checkout processes according to embodiments of the present invention.

However, it should be noted that the preferred CNN 100 of FIG. 7 utilizes a plurality of hidden layer representations—corresponding to respective tasks of $g_1$ to $g_4$—to provide additional performance benefits when executed in low-power mobile electronic devices 20. For example, less complex feature representations may be required to perform objectness detection (i.e., $g_2$) than to do object classification (i.e., $g_1$). Because feature representation complexity of a convolutional neural networks generally increases through the progression to later layers 102, $g_2$ may originate from the representation output of earlier layer 102c. Consequently, if a given objectness identification process identifies only background images, propagation through the remaining layers of the CNN 100 may be aborted, saving unnecessary consumption of resources from propagation through the remaining layers of the CNN 100. It should be noted that embodiments utilizing $g_4$ merely for quick-addition of anomalous product classes or the like may position the arm as illustrated in FIG. 7 (or, optionally, at another layer, preferably prior to 102n), whereas use of the $g_4$ arm for object classification (whether exclusively or redundantly with $g_1$) may lead to placement in later layers (e.g., at 102n).

The multi-objective approach outlined above may enable significant power savings. For example, while the mobile electronic device 20 is active between customers and/or between products, the CNN 100 need merely be looped through propagation of the layers preceding and constituting $g_2$ until an objectness determination identifies a product to be classified. Importantly, however, CNN 100 comprises a single convolutional network—allowing performance of multiple objectives in a single forward-pass through the CNN 100—for all features f extracted, while minimizing the size of downstream arms.

Integrating Weight Data

Weight data can be injected into the classification pipeline of the CNN 100 at a variety of entry points. In an embodiment, the current weight provided by a scale (e.g., scale 64) or a temporary window of weight data is considered as an input feature to an additional end model, such as a final Logistic Regression, Support Vector Machine, or other classifier. An exemplary end-model may be considerable as an additional fully-connected (or 1×1 convolutional) layer having appropriately chosen loss features in the object classification arm of the neural network.

Such an end model classifier may be built over the Softmax output $[g_1(x)|f_w]$ or the logits $[h_{logit}|f_w]$, where $f_w$ is the feature vector corresponding to the weight data. The end model classifier may be trained with gold label weight annotations that have been pre-generated. A small amount of Gaussian noise can be added to such labels for data augmentation.

The classifier may, optionally, be utilized at runtime according to control logic. For example, if the current weight reading from a scale does not pass a predetermined threshold according to the control logic (e.g., over a predetermined number of frames), Softmax outputs may be used directly for object recognition. If the current weight does, however, meet or exceed the threshold, the weight-aware end-model outlined herein may be used, because it is implied that a user is attempting to weigh a product rather than just swiping it under the scanner.

Exemplary Method for Training Object Recognition Module

Figure 8:
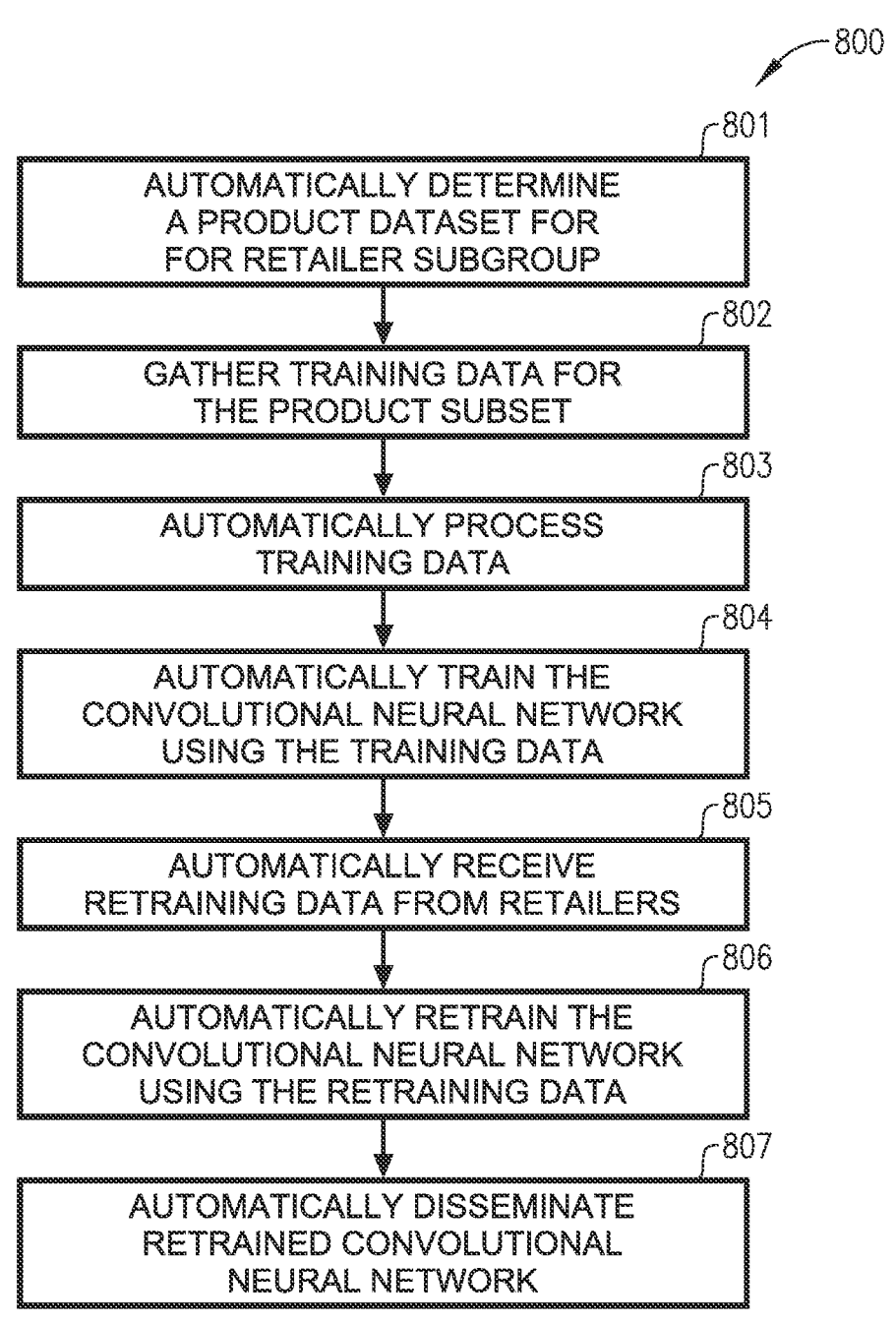
FIG. 8 illustrates at least a portion of the steps of an exemplary computer-implemented method for training and retraining the exemplary convolutional neural network in a low-power mobile device network according to an embodiment of the present invention.

FIG. 8 depicts a listing of steps of an exemplary computer-implemented method 800 for training and retraining an object recognition module in a low-power mobile device network. Some steps may be performed concurrently as opposed to sequentially, and may in some cases be performed in a different order. In addition, some steps may be optional. The computer-implemented method 800 is described below, for ease of reference, as being executed by exemplary devices and components introduced with the embodiments illustrated in FIGS. 1-7. For example, the steps of the computer-implemented method 800 may be performed by the backend server 14, and at least in part by the mobile electronic devices 20, communication server 16 and/or communication links 12 through the utilization of processors, transceivers, hardware, software (such as the POS software application 24 and software application 26 described herein), firmware, or combinations thereof. However, a person having ordinary skill will appreciate that responsibility for all or some of such actions may be distributed differently among such devices or other computing devices without departing from the spirit of the present invention and federated learning techniques may be used to distribute deep learning training tasks in particular.

One or more computer-readable medium(s) may also be provided. The computer-readable medium(s) may include one or more executable programs, such as a POS application and a backend software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Initially, it should be noted that the model parameters of a base network—such as a prior art base network—may be pre-trained on an object classification dataset, such as the dataset indexed by the web service offered under IMA-GENET™ (http://image-net.org) as of the date of initial filing of this disclosure. Pre-training may require multiple hours or days on a large computing cluster, and transfer-learning is preferably implemented to build on such pre-training for further use with CNN 100.

Training Data Selection

It should be noted that further, particularized development of CNN 100 for product classification is preferably performed through training on products sold by retailers in emerging markets. That is, the data will preferably primarily relate to the products sold by small to midsize retailers.

However, it is foreseen that embodiments of the present invention may be adapted for use in POS and/or checkout processes of large retailers without departing from the spirit of the present invention, with accompanying adjustments to the product dataset. Exemplary product sales data preferably indicate both sales volume and presence or absence of a barcode for each product of the dataset.

Sales data may be utilized by the application 26 of the backend server 14 to automatically determine the product dataset (i.e., the classes to be recognized by the object classification features of the object recognition module) of the CNN 100. Generally, it is understood that a universal product recognition system generally trades accuracy for the number of classes recognizable by the model (i.e., more classes equate to reduced accuracy). In an embodiment, the application 26 may train a plurality of models (i.e., versions of CNN 100)—each model treating a different number of product classes—and test same against photographs of corresponding products. Data regression may be performed on the test results to determine an approximate algorithm representing the relationship between the number of classes of CNN 100 and product classification accuracy. A target accuracy number and/or class limit may be selected to help determine the product dataset of each version of CNN 100 according to the following description.

At the most fine-grained level, seed models may be constructed for each retailer, resulting in an independently-trained version reflecting each retailer's peculiar products sales data. However, because a unique version of the CNN 100 may not often be practicably maintained for each retailer, a version may instead be developed for each subgroup of retailers, with the goal of capturing those classes that permit use of the CNN 100 to automatically identify (whether by barcode or by object recognition) the maximum number of products within prescribed accuracy drop limits for each retailer of the subgroup. For example, FIG. 1 illustrates two subgroups of mobile electronic devices 20a and 20b.

Referring to step 801, the backend server 14 may automatically determine a product dataset for a retailer subgroup. In an embodiment, the CNN 100 described in more detail above may be constructed and trained for implementation across dozens of subgroups, each subgroup comprising retailers selling substantially similar sets of products in substantially similar volumes. In an embodiment, subgroups may be delineated using standard deviation measures on product datasets, preferably weighted according to sales volume across the datasets. Alternatively, such subgroups may be identified from existing transaction data through an unsupervised technique such as k-means clustering. Cluster anchor products may serve as candidates for identifying a retailer to a particular subgroup. To obtain relevant sales data, a shopkeeper may be prompted to fill out a questionnaire regarding inventoried products during the POS application setup. Identified products can aid in identifying a subgroup to which the retailer belongs, allowing selection of the version of the CNN 100 trained with a corresponding seed model for download from the backend server 14.

In an exemplary market study performed in Nairobi, Kenya, it was determined that an average residential kiosk sells from between six hundred (600) and eight hundred (800) product classes (or "unique SKUs"), of which approximately thirty percent (30%) did not include barcodes. However, taking into account sales volume, a relatively small minority of product classes made up the majority of sales (e.g. bread, eggs, cigarettes). According to the study, it was typically possible to encapsulate more than ninety-five percent (95%) of sales by modeling two hundred (200) product classes. It should be noted that products lacking barcodes are commonly among the highest volume products in emerging markets, and that such products are preferably prioritized for capture by the CNN 100. It should also be noted that the highest volume products commonly hold across many different subgroups, enhancing the possibility of transfer-learning between versions of the CNN 100 implemented by the various subgroups.

An exemplary method for automatically determining the product dataset for a subgroup may proceed as follows. The top $\gamma_1$ percentile (e.g. top 50%) most common products (by sales volume) without barcodes may be included in the product dataset. Also, the top $\gamma_2$ percentile (e.g. top 10%) most common products (by sales volume) with barcodes may be included in the product dataset, with $\gamma_1$, $\gamma_2 \in [0, 1]$. In general, the relationship $\gamma_1 \gg \gamma_2$ may be observed to emphasize capturing products without barcodes while generally only capturing the highest-selling products with barcodes. The product dataset may be expanded or restricted based at least in part on the algorithm and/or goal values developed from the algorithm relating class numerosity to model accuracy (discussed above) to arrive at values for $\gamma_1$ and $\gamma_2$ that may be used to generate a seed set for the subgroup of a size that is practical for recognition, e.g. 700-fold classification.

Selecting a sufficiently large $\gamma_1$ may increase the chances that when a product is encountered that is not represented in the product dataset, then the probability that that product does not contain a barcode is very low, allowing the POS scanning flow to fall back to barcode recognition for identification of such products. For non-barcoded products outside of the product dataset, the shopkeeper may enter the item or price manually and/or perform quick-addition of a corresponding class (e.g., via few-shot learning) to "train" a local model for a new class, as described further below.

As an alternative to delineating subgroups by mathematical measures (e.g., standard deviation(s) and/or k-means clusters) as outlined above, retailer subgroups may be delineated by category. For instance, locality and shop category may form particular groups of interest that may be manually constructed from existing sales data (e.g. "Residential Duka in Nairobi," "Main street-side Duka in Nairobi," "Mini-mart in Mombasa," etc.) When a new shopkeeper first obtains the POS application 24, she may identify herself as belonging to one of the subgroups of the CNN 100 and obtain the corresponding version for setup. In embodiments where subgroups are automatically determined based on sales data, the retailer's mobile electronic device 20 may be used to upload sales data for classification among the subgroups, e.g., via SMS messaging and/or active data connection.

It should be noted here that all barcoded products are preferably saved for recognition by the barcode recognition module, it being understood that limitation of the product dataset for each version of a CNN 100 as described herein relates to classes the object recognition module is trained to recognize.

Referring to step 802, training data may be collected for the identified products of each subgroup (i.e., the product dataset). Training data may comprise images of products scanned in different lighting conditions and swiping patterns. It should be noted that products held in common between the product datasets of multiple subgroups preferably share training data during training across corresponding versions of the CNN 100.

Manual Data Acquisition

A "data collection stand" (not shown) may be used to enable a field team collecting training data to rapidly capture product image data from various angles and lighting conditions. Multiple cameras may be mounted to the stand. For example, three mounted cameras may be configured to observe each product from different angles. Camera feeds may be processed by a workstation (e.g., a desktop computer or the like) running a custom data capture tool implemented that is capable of simultaneously encoding video data from the three camera sources. Such a tool may, for example, be run on an Apple Mac workstation and implemented in the general-purpose, open-source programming language called SWIFT™.

A field agent capturing training data may follow a step-wise process, for example by: (1) where applicable, scanning a barcode on each product with a handheld barcode scanner connected to the workstation or, where not applicable, providing an input representing the lack of a barcode ID on the product; (2) measuring and inputting a weight of the product (if unknown in manufacturer-provided product data); and (3) capturing image data from the product in various lighting conditions and swiping patterns, annotating in each step whether a given side contains a barcode or not.

In an embodiment, one daylight configuration and two night scenes may be captured for each product (one with relatively uniform dark lighting and one with top-lighting, leading to harsher shadows), in each case according to three different swiping patterns (one top scene and one bottom scene, in each case moving the product back and forth slightly, as well as one "turn" scene in which the product is turned with one or two hands so that all sides are visible at least once). An exemplary video length of three and one-half seconds (3.5 s) for each camera and lighting condition/scanning pattern has been shown to provide a good balance between minimizing the field agent's scanning time and gathering sufficient data for each product.

In addition, training data to enable the objectness functions of the CNN 100 (i.e., 'none' class background data) may be collected by swiping an empty hand on the scanner and collecting short videos of typical background objects (e.g., the bed 60 of the stand 58, shop counters, etc.) and/or by online scraping.

A software tool running on the workstation may be configured to automatically upload the gathered training data to the backend server 14 for processing, cleaning and/or review.

Referring to step 803, the training data may be re-weighted and/or augmented. As field agents may gather different amounts of data per product, a backend process may re-weight the gathered training data to better reflect true distribution before passing it into the training pipeline for CNN 100. In an embodiment, this may be achieved through uniform sampling, where a fixed number of images for each product class is drawn at random from the training data available for the product class. The drawn data may be stored in serialized buffers and randomized for training. In practice, sampling may be chosen to better approximate a true known data distribution, which may be treated as probabilistic priors on the class occurrence, for example one obtained by analyzing actual sales data from retailers.

Self-gathered training data may also be augmented with user- or manufacturer-provided image data, images acquired through online scraping, or the like, as discussed further below.

It should be noted that training data for the objectness classification and barcode recognition tasks may be weighted separately. In practice, a 50/50 split between the two classes may comprise a good benchmark.

Moreover, data from one or more lighting conditions, swiping patterns, or scanning runs may be withheld for hyper-parameter tuning and evaluation of the model.

Neural Network Training

Referring to step 804, training data (images) may be preprocessed according to similar techniques applied at inference-time (as detailed above).

Referring to step 804, the gathered and preprocessed training data may be used to automatically train the CNN 100. During training, the amount of available image data may be increased with known data augmentation techniques that may be pre-computed or part of a training computational graph, including, but not limited to random crops, contrast distortions, color distortions, small affine transformations, and ninety-degree (90°) degree rotations. Preferably random rotations are also performed to increase robustness.

Further, training is preferably performed using batch normalization on most layers (as discussed in more detail below), regularization, gradient clamping, dropout, and other known training techniques. Gradients may be calculated and optimized with a RMSProp algorithm with stepped learning rate decay or a similar suitable approach.

Generally, training may be conducted using a variety of deep learning frameworks permitting the construction of computational graphs and automatic differentiation for convenience. Exemplary frameworks include: the open-source software library offered under TENSORFLOW™ as of the date of initial filing of this disclosure; the open source framework offered under CAFFE™ as of the date of initial filing of this disclosure; the open source library offered under THEANO™ as of the date of initial filing of this disclosure; and/or other similar tools. Training may be performed on a single computer or across a large cluster, and may use GPUs or other dedicated hardware (e.g. tensor processing units (TPUs)) for acceleration.

More particularly, and recalling functions $g_1$ to $g_4$ outlined above, given a true value y for each image of the training data, a separate training loss for each arm may be formed according to certain loss functions chosen in order to accomplish the goal of each particular arm. For example:

$$L_1 = -\Sigma_{j=1}^{K} \mathbb{1}\{j = \boldsymbol{y}_{product}\} \log g_1(x)_j$$

$$L_2 = -[\boldsymbol{y}_{objectness} \log g_2(x) + (1 - \boldsymbol{y}_{objectness}) \log(1 - g_2(x))]$$

$$L_3 = -[\boldsymbol{y}_{barcode} \log g_3(x) + (1 - \boldsymbol{y}_{barcode}) \log(1 - g_3(x))]$$

$$L_4 = \max\{d(g_4(x_a), g_4(x_p)) - d(g_4(x_a), g_4(x_n)) + \alpha_{margin}, 0\},$$

Referring in more detail to each in turn, $L_1$ is the standard cross-entropy multiclass loss, and corresponds to the object classification task (where $\mathbb{1}\{\bullet\}$ is the binary indicator function). $L_2$ and $L_3$, respectively, are logistic regression losses corresponding to the objectness classification and barcode detection tasks. (For convenience of implementation, these may be represented as multi-class objectives with two classes.) $L_4$ is an embedding loss chosen according to the aim of creating feature representations that are suitable for anomaly detection and provide good geometric interpretability (i.e. similar products are close in the feature space in cosine or Euclidean distances or can be mapped to product distributions in Mahalanobis distance). Various such loss functions have been proposed in the computer vision literature. (See, for example, the following, which is hereby incorporated by reference herein in its entirety: Song, Hyun Oh, Xiang, Yu, Jegelka, Stefanie, Savarese, Silvio. "Deep Metric Learning via Lifted Structured Feature Embedding." Arxiv.org. Stanford University and Massachusetts Institute of Technology. Jul. 11, 2018 (https://arxiv.org/abs/ 1511.06452)). One choice for this setting is a triplet loss. This loss is computed for triplets $x_a$, $x_p$, $x_n$ of training data, which can be batched such that $x_a$ represents an "anchor" to which $x_p$ is a positive example and $x_n$ is a negative example. That is, two examples $x_a$, $x_p$ are of the same true label and $x_n$ is of a different class. (This can be extended to higher level categories.) A distance metric (i.e., as used in anomaly detection described below) is represented by d, and $\alpha_{margin}$, is a constant hyper-parameter. The $\ell$ –2 norm, $d=\|\cdot\|_2$ is a practical choice. One of ordinary skill will appreciate that other suitable structural loss options may be implemented without departing from the spirit of the present invention.

In an embodiment, training proceeds with a view to optimizing the CNN 100 according to joint objectives by combining multiple losses into a single (weighted) loss function $L=\gamma_1 L_1+\gamma_2 L_2+\gamma_3 L_3+\gamma_4 L_4$. The network weights and parameters may be optimized to minimize the loss L using a gradient-based algorithm such as RMSProp. However, this approach may require determination of true value annotations for the four different criteria, which are fundamentally different annotations over the same dataset. Moreover, an "empty" or "none" category may be maintained for each product class. In the combined or single-loss approach, class imbalance becomes difficult to manage between $L_1$ and $L_2$, at least because including too many "background" images skews the balance for $L_1$. Additionally, the $L_4$ loss may place an otherwise undesirable constraint on the batch size and training data structure (i.e. when using a triplet loss).

To address these issues, in a preferred embodiment training may be performed in interleaved stages, optimizing one loss at a time, taking a set number of gradient steps $\nabla_\theta L_1$ before moving on to $\nabla_\theta L_2$, and so on ($\theta$ represents the relevant parameters of the network). To weigh the objective importance, for each stage the learning rate may be adjusted and one or more layers of the CNN 100 may be held constant. In a preferred embodiment, $L_1$, $L_2$, $L_3$, and $L_4$ are initially trained alternately in this order, with higher learning rates (by a factor of 2-10× depending on the network architecture) assigned to $L_1$ and $L_4$. The learning rates are decayed throughout training. Finally, all reused layers, that is the layers that do not correspond to sub-networks specific to the arms $g_1$ through $g_4$, are held constant and fine-tuning is performed with a further lowered learning rate on those "end layers" to tune the task-specific end networks based on model parameters determined during main training. Appropriately pre-sorted/randomized arrangements of the training data may be used during corresponding training stages to best approximate the true data distribution for each task.

Trained Quantization and Compression

Further, quantization is preferably performed in the training pipeline for improving performance on low-power mobile device networks. More particularly, few shopkeepers' phones in a low-power mobile device network may have floating point acceleration units that may be easily utilized at inference time (i.e., when the CNN 100 is used by the retailer for POS classification). Thus, in preferred embodiments of the present invention, model parameters (e.g., weights between nodes of the network) are converted to 8-bit (or lower) representations. Further, quantized value ranges for the network parameters are preferably identified during training and the CNN 100 may be fine-tuned to perform well on quantized values. More particularly, "min/ max" and "fake quantization units" may be injected at training time, similar to the approach described in the following reference, which is hereby incorporated herein by reference in its entirety: (Jacob, Benoit, Kligys, Skirmantas, Chen, Bo, Zhu, Menglong, Tang, Matthew, Howard, Andrew, Adam, Hartwig, Kalenichenko, Dmitry. "Quantization and Training of Neural Networks for Efficient Integer-Arithmetic-Only Inference." Arxiv.org. Google, Inc. Jul. 11, 2018 (https://arxiv.org/pdf/1712.05877.pdf)). More particularly, in each case before a quantized operation in the graph (for example, any convolution followed by ReLU or other activation function), the fake quantization unit may clamp the input values to the specified range, forcing the CNN 100 to adapt in a forward pass. Preferably, quantization is not performed in backward passes during training, and full-floating point values may be used to compute gradients.

It should be noted that large outliers may expand the quantization ranges undesirably, at least because large ranges may reduce the signal power of more common smaller signals, so the CNN 100 may be adapted to avoid such outliers (e.g., if the CNN 100 was not designed with quantization in mind). For example, where MobileNet v1 is incorporated into the architecture of CNN 100, quantization performance may be improved by removing batch norm and ReLU layers between each depth-wise and point-wise convolution step. By way of illustration, industry literature examines operation of another MobileNet v1 system on ImageNet reference data in the following paper, which is hereby incorporated herein in its entirety by reference: (Sheng, Tao, Feng, Chen, Zhuo, Shaojie, Zhang, Xiaopeng, shen, Liang, Aleksic, Mickey. "A Quantization-Friendly Separable Convolution for MobileNets." Arxiv.org. Qualcomm Canada, Inc. Jul. 11, 2018 (https://arxiv.org/pdf/1803.08607.pdf)).

For CNN 100, the base model may be trained without quantization. Initial transfer learning may be performed without quantization. In the last step, trained quantization may be performed with a lowered learning rate. Fine-tuning may be performed for each objective function and all layers.

In addition, model compression may be performed in the training pipeline for improved performance of the CNN 100 on low-power mobile device networks. More particularly, the CNN 100 may be compressed using Huffman Coding, by performing fine-tuned pruning (removing unnecessary connections from the computational graph) or a number of other steps. Generally, useful compression methods of a pipeline are described in the following paper, which is hereby incorporated by reference herein in its entirety: (Han, Song, Mao, Huizi, Dally, William J. "Deep Compression: Compressing Deep Neural Networks with Pruning, Trained Quantization and Huffman Coding." Arxiv.org. Stanford University and Tsinghua University. Jul. 11, 2018 (https://arxiv.org/pdf/1510.00149.pdf)). While quantization provides significant (and perhaps, the primary) performance boost, other compression steps for reducing the size of CNN 100 may contribute to viability for use in POS application 24. A smaller size may lower the electronic burden and/or power consumption associated with execution of the object recognition module of the CNN 100 at mobile electronic devices 20, may reduce the overall memory footprint of the POS application 24, and/or may reduce processor cache misses. However, it is foreseen that trained quantization may be used in training without such additional compression steps without departing from the spirit of the present invention.

The trained versions of the CNN 100 may be automatically disseminated to the mobile electronic devices 20 of corresponding retailers. Preferably, each trained, disseminated version of the CNN 100 is configured to perform all computations using 8-bit values, e.g., dropping all fake quantization and other unnecessary units from the computational graph.

Active Learning

Referring to step 805, additional training data ("retraining data") is preferably received automatically from retailers. The retraining data may comprise image data and transaction metadata uploaded by retailers via mobile electronic devices 20. For instance, shopkeepers with access to a continuously or frequently stable data connection may be rewarded for their contributions and may elect to upload image or computer vision feature data. Feature data may, for example, constitute output(s) of one or more hidden layers of the CNN 100 and/or a feature embedding generated using a structured loss, such as $g_4$.

Referring to step 806, the CNN 100 may be periodically retrained using image data (and, optionally, transaction metadata) uploaded by retailers (and/or by other image data). Retraining may be conducted in several scenarios, such as (1) to improve recognition of existing classes of products; (2) to add one or more classes of products to the CNN 100; and/or (3) to collapse closely-similar products into a single class.

Recognition improvement retraining (1) may be conducted periodically, upon receipt of a sufficient batch size of retraining images for respective product class(es), and/or upon occurrence of other triggering events. Expanding the classes of products the CNN 100 is trained to recognize (2) is preferably done only if certain threshold(s) is/are met, at least because of the general principle discussed above that adding classes of products to the CNN 100 is likely to reduce the overall accuracy of the CNN 100. In an embodiment, the algorithm(s) and related computations discussed above for determining the initial set of product classes may be applied in whole or in part to determine whether the barcode status and/or sales volume of the new proposed product class(es) warrant addition to the CNN 100. Collapsing similar products into a single class (3) may be performed as frequently as desired—as doing so reduces the total number of product classes in the CNN 100. In each case, disseminating updates or upgrades to versions of the CNN 100 to mobile electronic devices 20 may be done periodically, with an eye to balancing the importance of each update/upgrade against the consumption of resources required for retailers to complete each update/upgrade.

Recognition Improvement Retaining

Referring to recognition improvement retaining (1), each of the retraining data generally comprises a subset of one or more image frames capturing a product known to the CNN 100, as well as transaction metadata or the like identifying the product class determined by the capturing retailer when completing a corresponding POS transaction. For example, the retailer may have executed the POS application 24 on a corresponding one of the mobile electronic devices 20 during a POS checkout procedure. The object recognition module and/or the barcode recognition module—one or both of which preferably being embodied by the CNN 100 discussed herein—may classify a product swiped through the stand 58 as being in a particular product class. Alternatively, the shopkeeper and/or customer may have manually selected the product class from among those known to the CNN 100 via manual input to the mobile electronic device 20. Accordingly, the product may have been recorded to the digital shopping cart reflecting products to be purchased. The transaction management module of the POS application 24 may have thereafter determined the availability of an active data connection, and uploaded a subset of frame(s) captured in connection with identification of the product, together with transaction metadata indicating the identified class of the product, to the backend server 14.

It should also be noted that each candidate pairing of image subset and product class identification received from a retailer is preferably vetted and cleaned prior to being added to the set of retraining data. Such vetting may include practical heuristics to provide stronger gold labels. For example, only candidate pairings meeting or exceeding a threshold disposition may be added to the retraining data. Such vetting may, for example, require that the candidate pairings be associated with completed or paid transactions—for example, as reflected in associated transaction metadata—to be added to the retraining data. Alternatively, only candidate pairings that were not voided or undone in the course of the corresponding transaction may be added to the retraining data.

New Product Class Retraining

Referring to new product class retraining data (2), each candidate pairing may comprise a subset of one or more image frames capturing a product unknown to the CNN 100 as well as transaction metadata indicating a unique product label not yet associated with any product class in the CNN 100. The candidate pairing may be identified by the backend server 14 as unassociated by comparing the unique label against labels associated with product classes known to the CNN 100, through transaction metadata indicating that the candidate pairing was captured through a quick-addition operation performed by the retailer (discussed in more detail below), or otherwise within the scope of the present invention.

In support of further vetting and cleaning processes, the backend server 14 may automatically gather previously-used training data from the CNN 100. This previous training data may be represented herein as: frame subsets $x^{(1)}, \ldots, x^{(N)}$ with corresponding labels $y^{(1)}, \ldots, y^{(N)}$.

Referring again to recognition improvement retraining processes (1), an exemplary candidate pairing may be represented by: frame subset $x_u$, with corresponding label $y_u$. In a cleaning process, the backend server 14 may compute a feature representation of $x_u$, such as $g_4(x_u)$ and may compare the feature representation in distance to a characteristic embedding for the user-provided class label $y_u$. More particularly, an exemplary characteristic embedding may comprise the mean embedding computed from a sampling of the previous training data according to the following:

$$d\left(g_4(x_u), \frac{1}{N}\sum_{i:y^{(i)}=y_u} g_4(x^{(i)})\right) < \alpha_{bootstrap}$$

$\alpha_{bootstrap}$ may represent a bootstrapping threshold which controls how much data is included for performing bootstrapping during classifier training. Additional outlier detection may be applied to improve the stability of this check. A sample of the "approved" data may additionally or alternatively be reviewed by a human operator. If $x_u$ passes the cleaning check, the candidate pairing $x_u$ and true label $y_u$ may be added to the retraining data as an additional sample.

Referring again to class addition processes (2), candidate pairings provided by retailers may be represented as frame subsets $x_u^{(1)}, \ldots, x_u^{(N')}$ with corresponding user-generated and/or transaction metadata-derived labels $y_u^{(1)}, \ldots, y_u^{(N')}$. Generally, the total class population of the CNN 100 following retraining should be determined manually and/or automatically by the backend server 14 according to the algorithm representing the relationship between the number of classes of CNN 100 and product classification accuracy, target accuracy number and/or class limit discussed in more detail above. In an embodiment, it is desirable to combine similar product labels into a single class. The combination(s) may, for example, be performed by implementing one or both of two fundamental approaches: label combination, described in more detail below, and unsupervised clustering in embedding-space.

Initially, feature embeddings $g_4(x_u^{(1)}), \ldots, g_4(x_u^{(N')})$ for the candidate pairings may be extracted using the current CNN 100 (trained on the previous training data). The extracted feature embeddings may be used as input to a clustering algorithm. The clustering algorithm may produce a set of clusters $\{c_1, c_2, \ldots\}$ that are sets of $x_u$'s with corresponding $y_u$'s. The clusters may correspond to candidate new product classes represented by all the candidate pairings. Characteristic images of the clusters may be presented to a human annotator for selection of new classes from among the clusters for addition to the CNN 100. The annotator may also select from among the labels $y_u$ and/or may generate a unique label for association with each new class whose addition is warranted under the analysis outlined above. Alternatively, the backend server 14 may automatically analyze the spacing of the clusters—alone or in conjunction with the algorithm representing the relationship between the number of classes of CNN 100 and product classification accuracy, target accuracy number and/or class limit—to automatically determine the new classes (and, therefore, the overall population of product classes to be included in the new version of CNN 100 to be generated through retraining). The backend server 14 may also automatically label each new class, for example using a "majority rules" rule on the y($\cdot$)'s together with deterministic label cleaning procedures. Preferably, any proposed new classes are also checked to ensure there is no duplication of existing class(es). Alternatively or additionally, checks for duplication may be performed during downstream label combination, as discussed in more detail below. The backend server 14 may gather retraining data corresponding to the new classes. Unsupervised clustering may be implemented using a variety of off-the-shelf algorithms such as K-means or hierarchical clustering and may be parameterized to control the level of correction for outliers. One of ordinary skill will appreciate that several techniques may be used for cleaning for active learning (i.e., quick-addition) and classifier bootstrapping without departing from the spirit of the present invention.

Once the class population of the retrained CNN 100 and/or the candidate pairings comprising the retraining data is/are determined according to the above, retraining may proceed. Model parameters from the current CNN 100 are preferably reused, where applicable, to initialize the retrained CNN 100. If new classes are added according to class addition processes (2), updated layers may be ordered such that the parameters corresponding to the previous classes are used for initialization. For example with $g_1(x)$ =softmax(M$\hat{f}$(x)+b), if M of the present CNN 100 has K and b had rows and the retrained CNN 100 will have K'>K rows, re-initialization may only occur for the added K'–K rows. The learning rate and other hyper-parameters may be adapted appropriately to adjust to the fine-tuning setting. All types of retraining may proceed substantially in accordance with the other training procedures described elsewhere herein, except as otherwise noted.

It should be noted, however, that other initialization and/or retraining approaches may be used without departing from the spirit of the present invention. It should also be noted that a collection of convolutional neural networks may be trained and evaluated, selecting the best one for dissemination, within the scope of the present invention.

Referring now to retraining CNN 100 to collapse similar labels into a single class (3), an exemplary scenario in which such processes are useful is when the CNN 100 includes classes representing several subtypes of one particular product and/or non-differentiable brands of a product. The product subtypes may appear quite similar, e.g., with or without packaging. For example, diapers of different brands and different sizes of the same washing powder may be difficult to differentiate visibly. Additional information, such as weight data, may be required to disambiguate the sub-types, and in some cases automatic disambiguation may be impossible or impractical. In such cases, it is preferable to collapse the sub-type classes and flag the consolidated class. The flag may be recognized by the POS application 24 during classification processes of a POS checkout procedure, causing the POS application 24 to generate instructions for a prompt to the customer/shopkeeper populated by the sub-types for manual selection. Collapsing classes according to such processes is preferable to leaving the subtypes in independent classes of the CNN 100 (though either approach may lead to a prompt for manual input during POS checkout procedures as described above) to improve robustness of the CNN 100 and avoid forcing earlier layers to pick up nuanced features in order to differentiate the closely-similar subtypes, which may lead to overfitting.

An exemplary process for collapsing subtypes may begin with a human operator marking different product sub-types as belonging to the same collapsed class. Also or alternatively, a human operator may apply tags and/or categories to products and text-based heuristics may be used to collapse certain of the products into a single class. Preferably, however, iterative training may be utilized for collapsing similar labels into a single class (3), as discussed in more detail below.

Figure 9:
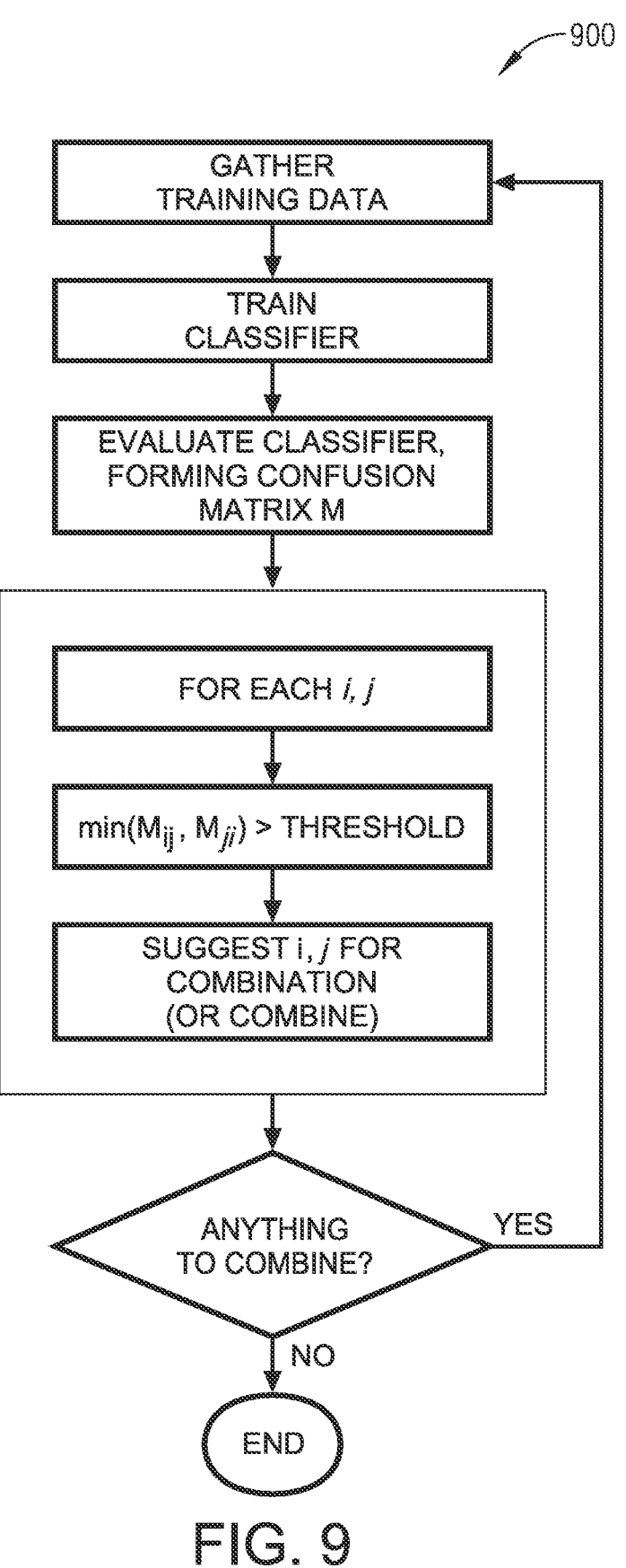
FIG. 9 is a flowchart of various steps or actions for collapsing product subtypes into a single class of the exemplary convolutional neural network in a low-power mobile device network according to embodiments of the present invention.

Iterative training may proceed as illustrated in FIG. 9, for example as automatically implemented on a periodic basis by the backend server 14. Generally, the process outlined in FIG. 9 may iterate until an accuracy threshold or a maximum number of steps is reached. A classifier C may train on un-collapsed or partially collapsed data. Upon training, the classifier C may be evaluated on previous training data $X=\{x^{(1)}, \ldots, x^{(N)}\}$ with corresponding true class labels Y to form a confusion matrix M such that:

$$M_{ij}=\Sigma_k \mathbb{1}\{\arg\max C(x^{(k)})=i \text{ and } y^{(k)}=j\}$$

Accordingly, two-sided maxima in M may be considered as candidates for collapse. That is, if $M_{ij}$ and $M_{ji}$ are both large (according to one or more predetermined thresholds), classes i and j may be automatically combined. Alternatively or additionally, a human operator may be asked to confirm the classes proposed for collapse. Following collapse (i.e., determination of a new class population for the CNN 100) the new version of the CNN 100 incorporating the new class population may be automatically retrained by the backend server 14 as described elsewhere herein, including by using retraining data pairing image frames for all collapsed sub-types with the same (new, collapsed class) label and/or via post-hoc collapse at classification time, where a classification hit to any of the sub-labels can be treated as a hit for the set of concatenated labels.

One or more of the retraining approaches set out above may be omitted in embodiments of the present invention. One of ordinary skill will also appreciate that other retraining approaches may be used with a CNN 100 within the scope of the present invention. For example, in an embodiment, collapsing similar labels into a single class according to the above may be replaced with hierarchical classification methods according to which product categories are hierarchical labels. Data from a collective coarse (parent) class (e.g. "Washing Powder") may be utilized to train a CNN 100. The CNN 100 may use the coarse label information as background knowledge for predicting fine (child) label(s) (e.g. "OMO™ Washing Powder, 45 g").

Following training and/or retraining, new versions of the CNN 100 are preferably evaluated on a new withheld testing dataset and, upon confirmation, may be automatically disseminated with updates/upgrades to and/or initial downloads of the POS application 24. It should be noted that, for small class updates, it may suffice to retrain the last few layers of a neural network classifier, reducing the data size of the update further.

Various alternatives and expansions of the training approaches outlined herein may be adopted without departing from the spirit of the present invention. For example, to alleviate privacy concerns associated with image data, one or more steps of the retraining process can be implemented using federated learning techniques in which part of the learning process, such as feature extraction, backward or forward passes through existing networks, and even gradient steps are computed on mobile electronic devices 20 rather than or in addition to computation(s) at the backend server 14.

It is foreseen that various expansions to the general training and classification inference pipeline outlined herein may be incorporated within the scope of the present invention. For example, data priors from known product distributions may be explicitly built in and/or a network occurrence may be included. An exemplary network recurrence may include a hidden state that enables the classifier(s) to use information from more than just a single frame at a time per pass through the CNN 100.

Exemplary Method for Checking out Anomalous Products

Figure 10:
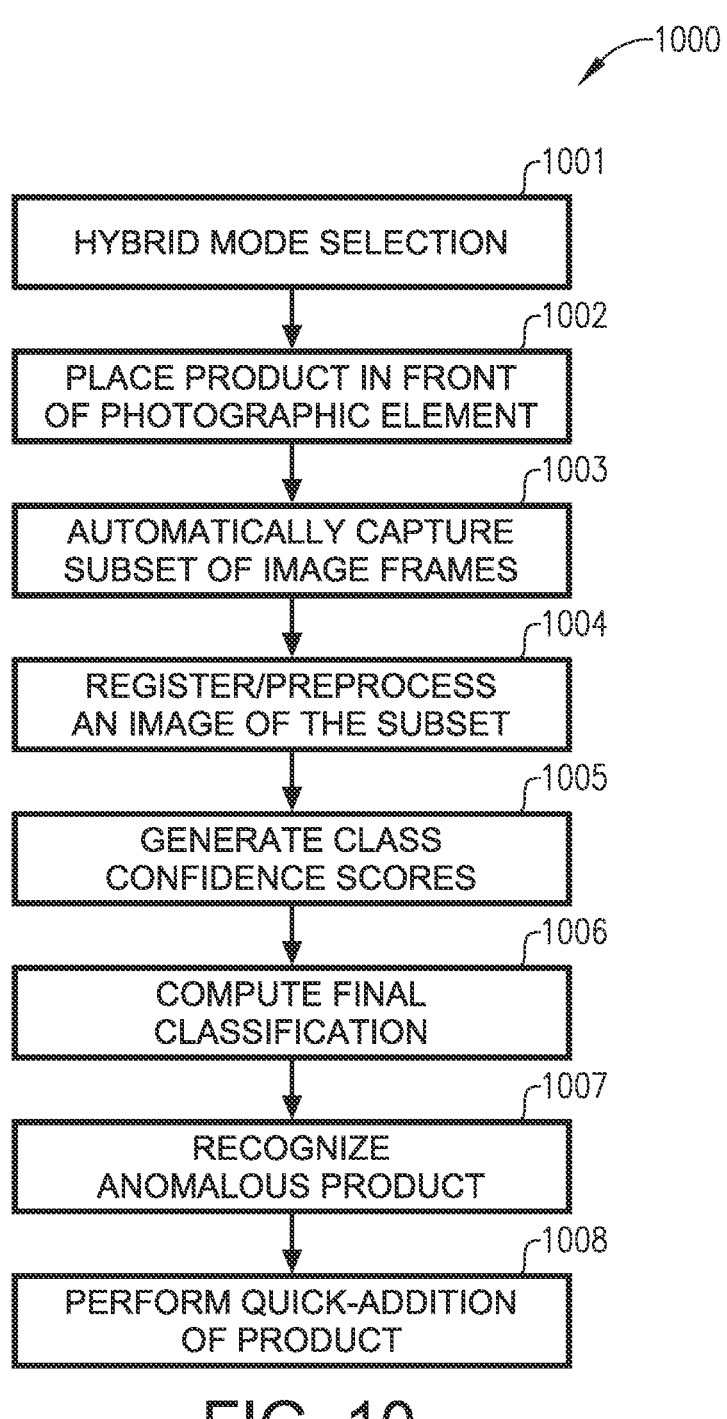
FIG. 10 illustrates at least a portion of the steps of an exemplary computer-implemented method for conducting a POS checkout process including an anomalous product in a low-power mobile device network according to an embodiment of the present invention.

Describing now an entire end-to-end implementation of an embodiment of the disclosed invention, FIG. 10 depicts a listing of steps of an exemplary computer-implemented method 1000 for completing a POS transaction involving a product unknown to a current version of a convolutional neural network. Some steps may be performed concurrently as opposed to sequentially, and may in some cases be performed in a different order. In addition, some steps may be optional. Some or all steps of the method may be performed in conjunction with steps generally described above in connection with use a POS application, training and/or retraining the convolutional neural network.

The computer-implemented method 1000 is described below, for ease of reference, as being executed by exemplary devices and components introduced with the embodiments illustrated in FIGS. 1-7. For example, the steps of the computer-implemented method 1000 may be performed by the mobile electronic devices 20 alone or in conjunction with the backend server 14, communication server 16 and/or communication links 12 through the utilization of processors, transceivers, hardware, software (such as the POS software application 24 and software application 26 described herein), firmware, or combinations thereof. However, a person having ordinary skill will appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a POS application and a backend software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 1001, a shopkeeper of a retailer may select hybrid classification mode of the POS application. It is foreseen that hybrid classification may be the default mode (i.e., not requiring affirmative manual selection) without departing from the spirit of the present invention. Referring to step 1002, the shopkeeper may place a product on the bed 60 of stand 58. Referring to step 1003, mobile electronic device 20 may automatically capture at least one image frame imgt. Referring to step 1004, the POS application 24 may register and/or otherwise preprocess the imgt to produce a registered image xt, and may utilize data from time-steps<t to compute other image metadata. Referring to step 1005, the object recognition module of the POS application 24—e.g., comprising CNN 100—may perform a product output and/or generate class confidence scores C(xt), including, for example, using weight data collected by scale 64 and/or one or more reference shapes for comparison. Referring to step 1006, moving-average or exponential-decay filtering and thresholding may be utilized by the POS application to provide a final classification.

Further, products are preferably scanned one or a few at a time by swiping them under the photographic element 44 of the mobile electronic device 20, without the need for manual input directing the photographic element 44 to "capture" image frames at a particular time. Products may intermediately be placed on a tray table of stand 58 for weight measurement or comparison to a reference shape. Upon scanning each product, the mobile electronic device 20 preferably provides confirmatory visual and/or auditory feedback to the shopkeeper. Such feedback may include a 'beep' sound, a vocalization of the product name, a visual flash, and/or a display of the product name and/or brand.

Referring to step 1007, the POS application may detect an anomalous product, i.e., one that does not currently belong to a class known to the CNN 100. Detection may be performed according to multiple methods. First, calibrated thresholding may be used to avoid the requirement for generative embeddings. Initially, the POS application 24 may compute the mean distribution of the Softmax prediction as a single vector substantially according to the following:

$$\mu_{softmax} = \frac{1}{N}\sum_{i=1}^{N} g_1\left(x^{(i)}\right) \in [0, 1]^K$$

Further, at inference time, for frame x depicting the product of an unknown class, a confidence score may be computed as the following dot product:

$$c = g_1(x)^T \mu_{softmax}$$

Still further, a predetermined lower threshold may be applied to c. If c lies below the threshold, the POS application 24 may automatically flag the product shown in the frame x as an anomaly.

Second, an alternative method of detection may utilize deep embeddings. More particularly, the POS application 24 may determine the product embeddings $g_4 \in R^{repr}$ to fit one or more generative distributions to training data, for example using a mixed Gaussian model. At inference time, the POS application 24 may determine whether $g_4(x)$ lies within the distribution up to a predetermined threshold. If not, the POS application 24 may automatically flag the product shown in the frame x as an anomaly.

Referring to step 1008, the mobile electronic device 20 may automatically, or in accordance with manual input of the shopkeeper, perform a quick-addition process for the identified anomalous product. More particularly, the POS application 24 may learn a representation for the unknown product using a limited amount of training data N' for a new class (referred to as K+1) generated by the shopkeeper. This can be achieved using a number of techniques. A first exemplary method does not include computing deep embeddings, and may proceed by computing a mean logit embedding according to the following:

$$\mu_{logit} = \frac{1}{N'}\sum_{i=1}^{N'} h_1\left(x^{(i)}\right) - b = \frac{1}{N'}\sum_{i=1}^{N'}\left(Mf\left(x^{(i)}\right)\right)$$

$\mu_{logit}$ may be appended as a row to matrix M (or equivalently as a Kernel channel to a 1×1 convolution representing matrix multiplication by M) and a zero-entry may be added as the $b_{K+1}$ bias term. Under this method of quick-addition, when the POS application 24 encounters an image frame in the future that is similar to the images comprising training data N', the dot product $\mu_{logit}^T f_1(x)$ should be large and the K+1st entry of the Softmax output $g_1(x)$ should be large, permitting the POS application 24 to positively identify the product of new class K+1.

In a second exemplary method for quick-addition, the POS application 24 may automatically compute a mean embedding according to the following:

$$\mu_{embed} = \frac{1}{N'}\sum_{i=1}^{N'} g_4\left(x^{(i)}\right).$$

Upon inference of a new frame x depicting a product potentially belonging to K+1, the POS application 24 may compute $\delta = d(\mu_{embed}, g_4(x))$ using the same distance metric $d(\cdot)$ that was chosen in the structural loss that produced the embeddings (see discussion above). X may be classified as belonging to the class K+1 if $\delta$ is below some a predetermined threshold value. This can either be done with a single μembed for all known classes, or one for each of the K known classes. In the second case X may be classified as belonging to class K+1 if $\delta$ below a predetermined threshold value for any of the K known classes. As noted in previous sections of this disclosure, in some embodiments the Softmax classifier $g_1$ may be eliminated and classification may be performed directly (and exclusively) using a K-means-like approach on the learned embeddings for all classes.

Quick-addition may permit automated and/or manual use of the object recognition module of embodiments of the POS application 24 to add new product classes for future automated recognition. Because recognition of the newly-added products may be sub-optimal in the absence of further training of the object recognition module on the new class(es), retailers may periodically upload corresponding image/label data for retraining according to preceding sections of this disclosure. It is foreseen that other methods of quick-addition may be utilized without departing from the spirit of the present invention.

It should also be noted that embodiments of the present invention may utilize the payment application 22 to consummate POS transactions using the mobile electronic devices 20. For example, the mobile electronic devices 20 may transmit transaction data to a payment network (not shown) for processing of payment transactions according to generally known mobile payment processes. The payment network may process the transaction request with an issuer and may provide a response confirming an approved transaction in connection with a POS checkout process in accordance with embodiments of the present invention.

One of ordinary skill will appreciate that the foregoing methods may occur independently or in one combined system without explicit isolation at a programming level. Moreover, one of ordinary skill will appreciate that one or more steps of the machine-learned method(s) described herein may be replaced by discrete, parameterized version(s) thereof within the scope of the present invention. Moreover, in any mathematical formulations, deterministic procedures may be replaced with probabilistic ones or certain performance optimizations without departing from the spirit of the present invention. For example, in general, a sum may be replaced with coarser sampling procedures for performance gains.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

I claim:

1. A computer-implemented method for configuring a mobile point-of-sale application to perform automated product-recognition checkout processes in a mobile device network, the computer-implemented method comprising:

providing a convolutional neural network including n hidden layers and corresponding model parameters, the n hidden layers including hidden layer n positioned downstream of the remaining hidden layers and downstream of an input segment of the convolutional neural network;

appending a fine classification arm to the convolutional neural network, the fine classification arm operating on the output from hidden layer n and being configured to perform object classification;

appending a second classification arm to the convolutional neural network, the second classification arm operating on the output from one of the remaining n hidden layers upstream from hidden layer n and being configured to detect a barcode in an image frame;

appending a third classification arm to the convolutional neural network and configuring the third classification arm to perform objectness detection on the image frame, the third classification arm operating on the output from one of the remaining n hidden layers upstream from the upstream hidden layer corresponding to the second classification arm, sharing convolutional features of the convolutional neural network with the first and second classification arms;

providing a plurality of image subsets, each image subset relating to a product class;

providing a plurality of true labels, each true label being applicable to at least one of the product classes;

providing a first loss function configured to generate output of the fine classification arm;

providing a second loss function configured to generate output of the second classification arm;

providing a third loss function configured to generate output of the third classification arm;

training the convolutional neural network to generate a trained convolutional neural network at least in part by passing the plurality of image subsets through the convolutional neural network, iteratively adjusting values of the model parameters based at least in part on one or more of: (A) output of the first, second and third loss functions and (B) derivatives of the first, second and third loss functions with respect to the model parameters in response to passing the plurality of image subset through the convolutional neural network, and configuring a control logic to perform: (i) aborting propagation through one or more of the n hidden layers which are downstream of the third classification arm if the third classification arm identifies only background objects in the image frame, or (ii) terminating object classification by the fine classification arm if the second classification arm reaches an output determination for the image frame.

2. The computer-implemented method of claim 1, further comprising automatically selecting the product classes prior to training the convolutional neural network at least in part by analyzing a plurality of candidate classes using an algorithm relating class numerosity to accuracy within the convolutional neural network.

3. The computer-implemented method of claim 1, further comprising automatically receiving transaction metadata associated with a retraining image subset, the transaction metadata including data indicating a disposition of a transaction originating the retraining image subset, automatically confirming that the disposition meets or exceeds a predetermined threshold disposition, retraining the trained convolutional neural network at least in party by receiving, from a mobile electronic device of a retailer, the retraining image subset, the retraining image subset being associated with a true label corresponding to a product class of the product classes, passing the retraining image subset through the trained convolutional neural network, iteratively adjusting values of the model parameters based at least in part on one or more of: (A) output of the first, second and third loss functions and (B) derivatives of the first, second and third loss functions with respect to the model parameters in response to passing the retraining image subset through the trained convolutional neural network.

4. The computer-implemented method of claim 1, further comprising retraining the trained convolutional neural network at least in party by receiving, from a mobile electronic device of a retailer, a retraining image subset, the retraining image subset being associated with a true label corresponding to a product class of the product classes, passing the retraining image subset through the trained convolutional neural network, computing a feature representation of at least one frame of the retraining image subset using the trained convolutional neural network, computing a characteristic embedding of at least one frame of an image subset of the plurality of image subsets belonging to the product class of the true label associated with the retraining image subset, comparing a distance between the feature representation and the characteristic embedding to confirm the retraining image subset belongs to the product class, based at least in part on the confirmation, iteratively adjusting values of the model parameters based at least in part on one or more of: (A) output of the first, second and third loss functions and (B) derivatives of the first, second and third loss functions with respect to the model parameters in response to passing the retraining image subset through the trained convolutional neural network.

5. The computer-implemented method of claim 1, further comprising retraining the trained convolutional neural network at least in part by receiving, from a mobile electronic device of a retailer, a retraining image subset associated with a new label not corresponding to one of the product classes, extracting a feature embedding for at least one frame of the retraining image subset from the trained convolutional neural network, submitting the feature embedding to a clustering algorithm to produce a cluster representing the at least one frame, adding a new class to the trained convolutional neural network corresponding to the retraining image subset, passing the retraining image subset through the trained convolutional neural network, iteratively adjusting values of the model parameters based at least in part on one or more of: (A) output of the first, second and third loss functions and (B) derivatives of the first, second and third loss functions with respect to the model parameters in response to passing the retraining image subset through the trained convolutional neural network.

6. The computer-implemented method of claim 1, further comprising computing a confusion matrix, determining two-sided maxima from the confusion matrix corresponding to two candidate classes of the product classes, comparing the two-sided maxima to one or more predetermined thresholds to confirm that the two candidate classes should be collapsed, and combining the two candidate classes in the trained convolutional neural network.

7. The computer-implemented method of claim 6, further comprising relabeling image subsets of the plurality of image subsets corresponding to the two candidate classes with a new combined label corresponding to a new combined class, retraining the trained convolutional neural network to generate a retrained convolutional neural network, at least in part by passing the relabeled image subsets through the trained convolutional neural network, iteratively adjusting values of the model parameters based at least in part on one or more of: (A) output of the first, second and third loss functions and (B) derivatives of the first, second and third loss functions with respect to the model parameters in response to passing the relabeled image subset through the trained convolutional neural network.

8. The computer-implemented method of claim 7, further comprising evaluating the retrained convolutional neural based on previous training image subsets against an accuracy threshold to determine whether additional class combinations may be recommended.

9. Non-transitory computer-readable storage media having computer-executable instructions stored thereon for configuring a mobile point-of-sale application to perform automated product-recognition checkout processes in a mobile device network, wherein when executed by at least one processor the computer-executable instructions cause the at least one processor to:

provide a convolutional neural network including n hidden layers and corresponding model parameters, the n hidden layers including hidden layer n positioned downstream of the remaining hidden layers and downstream of an input segment of the convolutional neural network;

append a fine classification arm to the convolutional neural network, the fine classification arm operating on the output from hidden layer n and being configured to perform object classification;

append a second classification arm to the convolutional neural network, the second classification arm operating on the output from one of the remaining n hidden layers upstream from hidden layer n and being configured to detect a barcode in an image frame;

append a third classification arm to the convolutional neural network and configure the third classification arm to perform objectness detection on the image frame, the third classification arm operating on the output from one of the remaining n hidden layers upstream from the upstream hidden layer corresponding to the second classification arm, sharing convolutional features of the convolutional neural network with the first and second classification arms;

provide a plurality of image subsets, each image subset relating to a product class;

provide a plurality of true labels, each true label being applicable to at least one of the product classes;

provide a first loss function configured to generate output of the fine classification arm;

provide a second loss function configured to generate output of the second classification arm;

provide a third loss function configured to generate output of the third classification arm;

train the convolutional neural network to generate a trained convolutional neural network at least in part by passing the plurality of image subsets through the convolutional neural network, iteratively adjusting values of the model parameters based at least in part on one or more of: (A) output of the first, second and third loss functions and (B) derivatives of the first, second and third loss functions with respect to the model parameters in response to passing the plurality of image subset through the convolutional neural network; and configure a control logic to perform: (i) aborting propagation through one or more of the n hidden layers which are downstream of the third classification arm if the third classification arm identifies only background objects in the image frame, or (ii) terminating object classification by the fine classification arm if the second classification arm reaches an output determination for the image frame.

10. The non-transitory computer-readable storage media of claim 9, wherein, when executed by the at least one processor, the computer-executable instructions further cause the at least one processor to automatically select the product classes prior to training the convolutional neural network at least in part by analyzing a plurality of candidate classes using an algorithm relating class numerosity to accuracy within the convolutional neural network.

11. The non-transitory computer-readable storage media of claim 9, wherein, when executed by the at least one processor, the computer-executable instructions further cause the at least one processor to retrain the trained convolutional neural network to generate a retrained convolutional neural network at least in part by receiving, from a mobile electronic device of a retailer, a retraining image subset associated with a true label corresponding to a product class of the product classes, passing the retraining image subset through the trained convolutional neural network, iteratively adjusting values of the model parameters based at least in part on one or more of: (A) output of the first, second and third loss functions and (B) derivatives of the first, second and third loss functions with respect to the model parameters in response to passing the retraining image subset through the trained convolutional neural network.

12. The non-transitory computer-readable storage media of claim 11, wherein, when executed by the at least one processor, the computer-executable instructions further cause the at least one processor to perform the following steps prior to passing the retraining image subset through the trained convolutional neural network automatically receiving transaction metadata associated with the retraining image subset, the transaction metadata including data indicating a disposition of a transaction originating the retraining image subset, automatically confirming that the disposition meets or exceeds a predetermined threshold disposition.

13. The non-transitory computer-readable storage media of claim 11, wherein, when executed by the at least one processor, the computer-executable instructions further cause the at least one processor to perform the following steps prior to iterative adjustment of values of the model parameters in response to passing the retraining image subset through the trained convolutional neural network computing a feature representation of at least one frame of the retraining image subset using the trained convolutional neural network, computing a characteristic embedding of at least one frame of an image subset of the plurality of image subsets belonging to the product class of the true label associated with the retraining image subset, comparing a distance between the feature representation and the characteristic embedding to confirm the retraining image subset belongs to the product class.

14. The non-transitory computer-readable storage media of claim 9, wherein, when executed by the at least one processor, the computer-executable instructions further cause the at least one processor to compute a confusion matrix, determine two-sided maxima from the confusion matrix corresponding to two candidate classes of the product classes, compare the two-sided maxima to one or more predetermined thresholds to confirm that the two candidate classes should be collapsed, and combine the two candidate classes in the trained convolutional neural network.

15. The non-transitory computer-readable storage media of claim 14, wherein, when executed by the at least one processor, the computer-executable instructions further cause the at least one processor to relabel image subsets of the plurality of image subsets corresponding to the two candidate classes with a new combined label corresponding to a new combined class, retrain the trained convolutional neural network to generate a retrained convolutional neural network, at least in part by passing the relabeled image subsets through the trained convolutional neural network, iteratively adjusting values of the model parameters based at least in part on one or more of: (A) output of the first, second and third loss functions and (B) derivatives of the first, second and third loss functions with respect to the model parameters in response to passing the relabeled image subset through the trained convolutional neural network.

16. The non-transitory computer-readable storage media of claim 15, wherein, when executed by the at least one processor, the computer-executable instructions further cause the at least one processor to evaluate the retrained convolutional neural network based on previous training image subsets against an accuracy threshold to determine whether additional class combinations may be recommended.

* * * * *